United States Patent [19]
Kiyanagi et al.

[11] Patent Number: 5,987,078
[45] Date of Patent: Nov. 16, 1999

[54] CARRIER REGENERATING CIRCUIT

[75] Inventors: Hiroyuki Kiyanagi; Masayuki Watabe, both of Sendai, Japan

[73] Assignee: Fujitsu Limited, Kanagawa, Japan

[21] Appl. No.: 08/872,624

[22] Filed: Jun. 10, 1997

[30] Foreign Application Priority Data

Sep. 19, 1996 [JP] Japan .................................. 8-247722

[51] Int. Cl.[6] .............................................. H04L 27/06
[52] U.S. Cl. ........................ 375/344; 375/326; 375/371; 329/302
[58] Field of Search .................................. 375/344, 326, 375/371; 329/302, 304, 306; 455/192.2, 182.2, 182.1, 260, 76

[56] References Cited

U.S. PATENT DOCUMENTS

| | | | |
|---|---|---|---|
| 5,260,671 | 11/1993 | Iso et al. .................................. | 329/302 |
| 5,579,346 | 11/1996 | Kanzaki .................................. | 375/344 |
| 5,633,898 | 5/1997 | Kishigami et al. ...................... | 375/344 |
| 5,661,761 | 8/1997 | Iwamatsu ................................ | 375/344 |

Primary Examiner—Stephen Chin
Assistant Examiner—Shuwang Liu
Attorney, Agent, or Firm—Helfgott & Karas, P.C.

[57] ABSTRACT

A carrier regenerating circuit used for a demodulator which demodulates many-valued orthogonal amplitude modulation signals. The carrier regenerating circuit consists of a first PLL (phase-locked loop) section, including a detector for detecting an intermediate-frequency signal using a local oscillator, a phase error detecting section and a first loop filter, which feeds back phase error information to the local oscillator via the first loop filter; and a second PLL (phase-locked loop) section, including a frequency control section a second loop filter, which feeds back a frequency control signal to the local oscillator via the second loop filter by performing an updating operation by means of the frequency control section when a mark ratio due to the phase error information deviates from a predetermined range. The carrier regenerating circuit with a simplified circuit configuration can always synchronize an input signal (a many-valued orthogonal amplitude-modulation signal) by quickly adjusting the frequency of a regeneration carrier signal to an optimum value even when the input signal is out of synchronization.

11 Claims, 12 Drawing Sheets

CARRIER REGENERATING CIRCUIT

BACKGROUND OF THE INVENTION

1) Field of the Invention

The present invention relates to a carrier regenerating circuit suitable for a demodulator used in a receiving-side radio equipment included in a radio communications system, and particularly for a demodulator that demodulates many-valued orthogonal amplitude modulation signals.

2) Description of the Related Art

FIG. 12 is a block diagram showing the configuration of receiving-side radio equipment in a radio system. Referring to FIG. 12, a demodulator (carrier regenerating circuit) 70 consists of an orthogonal detecting circuit 40 having a voltage-controlled oscillator (VCO) 46, an analog/digital (A/D) converting circuit 41, a phase error detecting circuit 42, a first digital/analog (D/A) converting circuit 43, a low-pass filter 44, an operational amplifier 45, a sweep generating source (low-frequency oscillator) 47, a second digital/analog (DIA) converting circuit 48, a low-pass filter 49, and a digital signal processing section 50.

The demodulator 70 shown in FIG. 12 employs a many-valued orthogonal amplitude-demodulation (many-valued QAM: Quadrature Amplitude Modulation) system.

The orthogonal detecting circuit 40 branches an input IF-band QAM signal (hereinafter, often referred merely to as an input signal) in two, and mixes (multiplies) the two branched input signals by two regenerated carrier signals supplied from the voltage-controlled oscillator 46, perpendicular to each other in phase, so that two kinds of baseband signals [I-channel (Ich) and Q-channel (Qch) signals] perpendicular to each other are obtained by orthogonally detecting the input signal.

The A/D converting circuit 41 converts each of baseband signals (analog signals) from the orthogonal detection circuit 40 into a digital signal, for example, of 8 bits (i7 to i0 and q7 to q0). The phase error detecting circuit 42 detects a phase error of a QAM signal output via the A/D converting circuit 41. In this case, the phase error detecting circuit 42 detects the phase error signal in an input signal based on the Ich polarity signal (polarity bit: $i_7$) representing the rotational direction of the signal point of the input signal and the Qch error signal (error bit: $q_5$) representing the rotational rate of the signal point. In contrast, the phase error signal may be detected based on the Qch polarity signal and the Ich error signal.

The first D/A converter 43 converts phase error information as digital information from the phase error detecting circuit 42 into an analog form. The low-pass filter 44 receives the digital information from the phase error detecting circuit 42 via the first D/A converting circuit 43 and then outputs a voltage control signal to the voltage controlled oscillator 46.

That is, in the demodulator 70, the input signal is synchronously detected by means of the PLL (Phase Locked Loop) circuit formed of the phase error detecting circuit 42, the first D/A converting circuit 43 and the low-pass filter 44.

The operational amplifier 45 controls the voltage controlled oscillator 46 in the orthogonal detecting circuit 40 by adjusting the direct current (DC) voltage from the low-pass filter 44 or 49 based on the reference voltage Ref, thus optimizing the DC voltage according to variations (performance errors) of the voltage controlled oscillator 46. A variable resistor (not shown) which varies the reference voltage Ref is connected to the operational amplifier 45.

The digital signal processing section 50 subjects a digital signal from the A/D converting circuit 41 to a desired compensating process such as amplitude equalizing process. Specifically, the digital signal processing section 50 outputs a frame alarm signal (FALM) when the input signal is completely out of synchronization.

Further, in order to execute a sweep operation, the sweep generating source 47 hunts a synchronous frequency of an input signal by supplying a ultra low frequency signal to the voltage controlled oscillator 46 based on the frame alarm signal from the digital signal processing unit 50. When the synchronization of the input signal is established, the sweep operation halts.

The second D/A converting circuit 48 converts the ultra low frequency signal (digital signal) output from the sweep generating source 47 into an analog signal. When receiving the signal from the sweep generating source 47 via the second D/A converting circuit 48, the low-pass filter 49 outputs it to the voltage controlled oscillator 46.

In the demodulator 70 with the above-mentioned arrangement, the orthogonal detecting circuit 40 orthogonally detects a QAM signal received, based on a regenerated carrier signal supplied from the voltage controlled oscillator 46 and then converts it into an Ich baseband signal and a Qch baseband signal. Then the A/D converting circuit 41 converts the Ich baseband signal and the Qch baseband signal into respective digital signals. The digital signal processing unit 50 subjects the respective digital signals to a desired compensating process to output demodulated signals.

The phase error detecting circuit 42 detects the phase error signal of an input signal based on the I-channel polarity bit $i_7$ and the Q-channel signal error bit $q_5$. The first D/A converting circuit 43 converts the detected phase error signal into an analog signal and then outputs it as phase control information to the voltage controlled oscillator 46 via the low-pass filter 44.

In such an arrangement, the voltage controlled oscillator 46 can supply regenerated carrier signals in synchronous with the input signal by adjusting the oscillating frequency according to the phase error signal detected by the phase error detecting circuit 42. Hence, the AID converting circuit 41 can always execute an A/D converting process at the optimum timing (phase).

However, when the input signal is actually modulated according to the many-valued QAM modulation system such as a 64-value, 128-value, 256 value, or 512-value QAM modulation system, the above-mentioned PLL circuit (carrier reproducing loop) cannot provide its sufficient capture range (or the difference between a send frequency and a receive frequency) (less than ⅒, compared with the 16-value QAM modulation system). Hence the sweep operation is performed using the sweep generator 47 shown in FIG. 12. That is, even if the input signal is completely out of synchronization, the input signal can be certainly synchronized by executing a frequency sweeping operation by means of the sweep generator 47.

However, in the demodulator 70 shown in FIG. 12, previous adjustment must be made using a variable resistor to tolerate the variation in characteristic of the voltage controlled oscillator 46. Further, when the input signal is completely out of synchronization, the sweep operation is performed using a ultra low frequency from the sweep generator (low-frequency oscillator) 47. However, it takes much time to reestablish the normal synchronization. That is, the problem is that the pulling operation is largely delayed.

When synchronization is reestablished, the sweep operation of the sweep generating source is interrupted. However, the difference between the free run at the point of time of the interruption (the frequency of a free-oscillated signal by the voltage-controlled oscillator 46 without any phase synchronization) and the local frequency of the transmission signal (IF signal) accounts for a steady-state phase error. Thus as the value of the many-valued modulation increases (e.g. 64-value or more), the steady-state phase error cannot be ignored. As a result, the error is shown as degradation in error rate when the signals are generated at the rear stage of the demodulator.

SUMMARY OF THE INVENTION

The present invention is made to overcome the above mentioned problems. An object of the present invention is to provide a carrier regenerating circuit in a simplified circuit configuration wherein even when an input signal (a many-valued orthogonal amplitude-modulation signal) is out of synchronization, the input signal can be always synchronized by quickly adjusting the frequency of a regeneration carrier signal to an optimum value.

In order to achieve the above objects, according to the present invention, the carrier regenerating circuit is characterized by a first PLL (phase-locked loop) section including a detector for detecting an intermediate frequency signal using a local oscillator, a phase error detecting section for detecting phase error information using the detected signal detected by means of the detector, and a first loop filter for filtering the phase error information detected by means of the phase error detecting section, wherein the phase error information is fed back to the local oscillator via the first loop filter; and a second PLL (phase-locked loop) section including a frequency control section for generating a frequency control signal for the local oscillator through an updating operation based on the phase error information, and a second loop filter for filtering the frequency control signal from the frequency control section, wherein the frequency control signal from the frequency control section is fed back to the local oscillator via the second loop filter by performing an updating operation by means of the frequency control section when the mark ratio due to the phase error information deviates from a predetermined range.

Furthermore, according to the present invention, the carrier regenerating circuit is characterized by a first PLL circuit including an orthogonal detector for detecting an intermediate-frequency signal using a local oscillator and then outputting detected signals perpendicular to each other, an A/D converter for AID converting the detected signals detected by the orthogonal detector, a phase error detecting section for detecting phase error information from each of the detected signals A/D converted by the A/D converter, a first D/A converter for D/A converting the phase error information detected by the phase error detection section, and a first loop filter for filtering the phase error information after the D/A conversion by the first D/A converter, wherein phase error information is fed back to the local oscillator via a first loop filter; and a second PLL loop circuit including a frequency control section for updating a frequency control signal for the local oscillator based on the phase error information when power set-up information has been received or while a mark ratio due to the phase error information is not within a predetermined range, and for interrupting an updating operation for generation of a frequency control signal when the mark ratio is within the predetermined range or while out-of-synchronization information has been received, a second D/A converter for D/A converting the frequency control signal from the frequency control section, and a second loop filter for filtering the frequency control signal after the D/A conversion by the second D/A converter, wherein the frequency control section executes an updating operation when the power set-up information is received or when the mark ratio deviates from the predetermined range, whereas after an updating operation for the frequency control signal generation is halted when the mark ratio is within the predetermined range or when out-of-synchronization information has been received, the frequency control signal from the frequency control section is fed back to the local oscillator via the second loop filter.

Hence, in the carrier regenerating circuit according to the present invention, the frequency control section monitors whether or not a mark ratio is within a predetermined range, based on phase error information from the phase error detecting section. When the mark ratio is not within the predetermined range, the frequency control signal from the frequency control section is fed back to the local oscillator of the orthogonal detector by urging the frequency control section toward the updating operation. Hence the advantage is that a degradation in error rate can be prevented because the steady-state phase error can be suppressed by quickly matching the shift in frequency between the transmission frequency and a frequency of a regenerated carrier signal.

According to the present invention, since the free-run of the local oscillator can be automatically adjusted, the sweep operation is not needed upon a normal use operation, so that the resynchronizing time can be reduced. This feature enables the performance of the carrier regenerating circuit and the quality of the whole radio equipment to be improved.

DESCRIPTION OF THE PREFERRED EMBODIMENT (a) Explanation of an Aspect of the Present Invention:

First, an aspect of the present invention will be described below with reference to the attached drawings.

Figure 1:
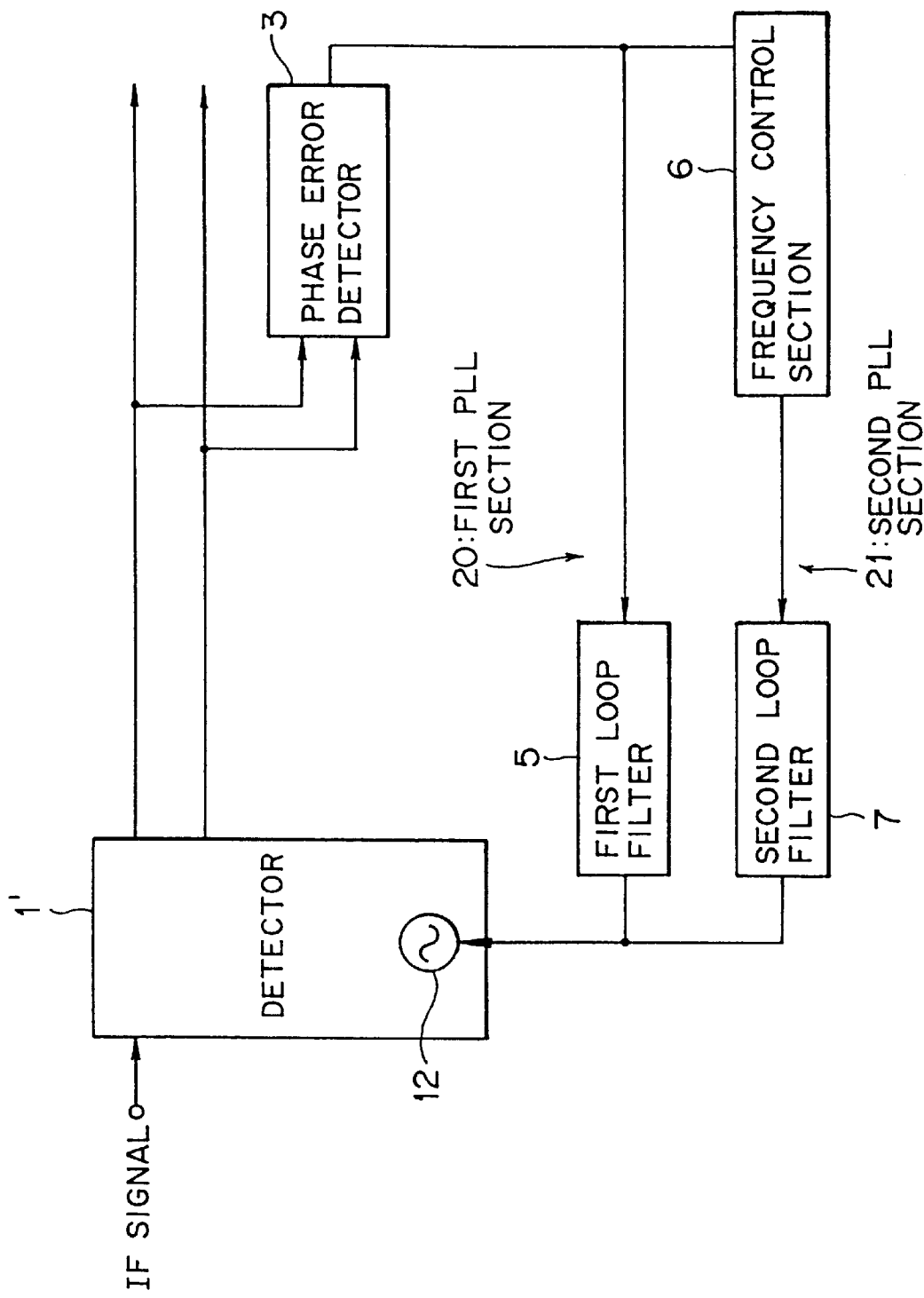
FIG. 1 is a block diagram showing an aspect of the present invention.

FIG. 1 is a block diagram showing an aspect of the present invention. Referring to FIG. 1, the carrier regenerating circuit consists of a detector 1', a phase error detecting section 3, a first loop filter 5, a frequency control section 6 and a second loop filter 7.

The detector 1' detects an intermediate-frequency signal using a local oscillator 12. The phase error detecting section 3 detects phase error information based on a detected signal detected by the detector 1'. The first loop filter 5 filters the phase error information detected by the phase error detecting section 3.

Numeral 20 represents a first PLL section. The first PLL section 20 includes the first loop filter 5 to feed back phase error information to the local oscillator 12 through the first loop filter 5.

The frequency control section 6 generates a frequency control signal for the local oscillator 12 through its updating operation, based on phase error information from the phase error detecting section 3. The second loop filter 7 filters the frequency control signal from the frequency control section 6.

Numeral 21 represents a second PLL section. The second PLL section 21 includes a frequency control section 6 and a second loop filter 7. When the mark ratio due to the phase error information deviates from a predetermined range, the frequency control signal from the frequency control section 6 is fed back to the local oscillator 12 via the second loop filter 7 by performing an updating operation by means of the frequency control section 6.

According to the carrier regenerating circuit of the present invention, the frequency control section 6 monitors whether or not a mark ratio is within a predetermined range, based on phase error information from the phase error detecting section 3. When the mark ratio is not within the predetermined range, the frequency control signal from the frequency control section 6 is fed back to the local oscillator 12 of the orthogonal detector 1' by performing the updating operation of the frequency control section 6. Hence the advantage is that a degradation in error rate can be prevented because the steady-state phase error can be suppressed by quickly matching the shift in frequency between a transmission frequency and a frequency of a regenerated carrier signal.

According to the present invention, since the local oscillator 12 can be automatically adjusted in a free-run mode, a sweep operation is not needed upon a normal use, so that the resynchronizing time can be reduced. This feature enables the performance of the carrier regenerating circuit and the quality of the whole radio equipment to be improved.

Further, the frequency control section 6 consists of an integrating circuit for integrating the phase error information, and a monitoring circuit for monitoring whether or not the mark ratio has deviated from the predetermined range, to halt the integrating operation of the integrating circuit while the mark ratio is within the predetermined range and to start the integrating operation of the integrating circuit when the mark ratio deviates from the predetermined range.

In concrete, the integrating circuit includes an adder for cumulatively adding the phase error information, and a latch circuit for selectively updating or holding the cumulative addition result from the adder. The monitoring circuit includes a counting circuit for up/down counting the phase error information and then generating an integrating operation halt signal while the mark ratio is within the predetermined range, and for generating an integrating operation permission signal when the mark ratio is not within the predetermined range.

In the carrier regenerating circuit according to the present invention, the integrating operation of the integrating circuit is halted while the mark ratio is within a predetermined range, and the integrating operation of the integrating circuit is started when the mark ratio deviates from the predetermined range. Hence the second PLL section can be operated only when required, without affecting the frequency control operation of the first PLL section. The frequency control process can be maintained stably.

Further, the frequency control section 6 generates a frequency control signal for the local oscillator 12 through an updating operation based on the phase error information when the mark ratio is not within the predetermined range, and halts the updating operation for the frequency control signal generation while the mark ratio is within the predetermined range or when out-of-synchronization information is received.

According to the carrier regenerating circuit of the present invention, the frequency control section 6 monitors whether or not a mark ratio deviates from a predetermined range, based on phase error information from the phase error detecting section 3. When the mark ratio is not within the predetermined range, the frequency control signal from the frequency control section 6 is fed back to the local oscillator 12 of the orthogonal detector 1 or 1' by performing an updating operation of the frequency control section 6. Hence the advantage is that a degradation in error rate can be prevented because the steady-state phase error can be suppressed by quickly matching the shift in frequency between a transmission frequency and a frequency of a regenerated carrier signal.

According to the present invention, since the free-run of the local oscillator 12 can be automatically, a sweep operation is not needed upon a normal use, so that the resynchronizing time can be reduced. This feature enables the performance of the carrier regenerating circuit and the quality of the whole radio equipment to be improved.

The frequency control section 6 includes an integrating circuit for integrating the phase error information, a switching circuit for producing the phase error information while the out-of-synchronization information is not detected and for switching to the output of the integrating circuit when the out-of-synchronization information is detected, and a monitoring circuit for monitoring whether or not the mark ratio has deviated from the predetermined range, to halt the integrating operation of the integrating circuit while the mark ratio is within the predetermined range and to start the integrating operation of the integrating circuit when the mark ratio deviates from the predetermined range; and for monitoring whether or not the out-of-synchronization information has been detected, to halt the operation of the integrating circuit, regardless of the value of the mark ratio, when the out-of-synchronization information is detected.

In this case, the integrating circuit includes an adder for cumulatively adding the phase error information, and a latch circuit for selectively updating or holding the cumulative addition result from the adder. The monitoring circuit includes a counting circuit for up/down counting the phase error information and then generating an integrating operation halt signal while the mark ratio is within the predetermined range or when the out-of-synchronization information is detected, and for generating an integrating operation permission signal when the mark ratio is not within the predetermined range.

According to the carrier regenerating circuit of the present invention, the integrating operation of the integrating circuit can be halted, regardless of the value of the mark ratio, when out-of-synchronization information is detected, whereas the frequency just before occurrence of out-of-synchronization is optimized by the second PLL section. Hence, the advantage is that resynchronization can be established without any sweep operation by removing the cause of degradation in quality of a radio trunk such as fading.

Moreover, the monitoring circuit resumes the integrating operation of the integrating circuit when a predetermined period of time has been elapsed after detection of out-of-synchronization information. In concrete, the carrier regenerating circuit further includes a timer circuit for outputting an event signal to the monitoring circuit when a predetermined period of time has been elapsed after detection of out-of-synchronization information.

As described above, in the carrier regenerating circuit according to the present invention, the integrating circuit can resume its integrating operation when out-of-synchronization is not recovered after a predetermined period of time from detection of out-of-synchronization information. Hence, it is not needed to prepare a dedicated sweep generating source to pull a synchronous frequency at an emergency by using a signal from the second PLL section even if the first PLL section cannot execute a unique pulling (phase synchronization). The carrier can be regenerated under any trunk environment, with a conventional sweep function maintained.

The frequency control section 6 starts updating operation in response to power set-up information to generate a frequency control signal.

According to the carrier regenerating circuit of the present invention, since the updating operation can be automatically started in response to power set-up information to generate the frequency control signal, a variation in characteristic of the local oscillator 12 can be absorbed without previously adjusting by a variable resistor. Hence the advantage is that the phase of the input signal can be quickly phase-synchronized just after the power set-up of the receiving-side radio equipment.

Figure 2:
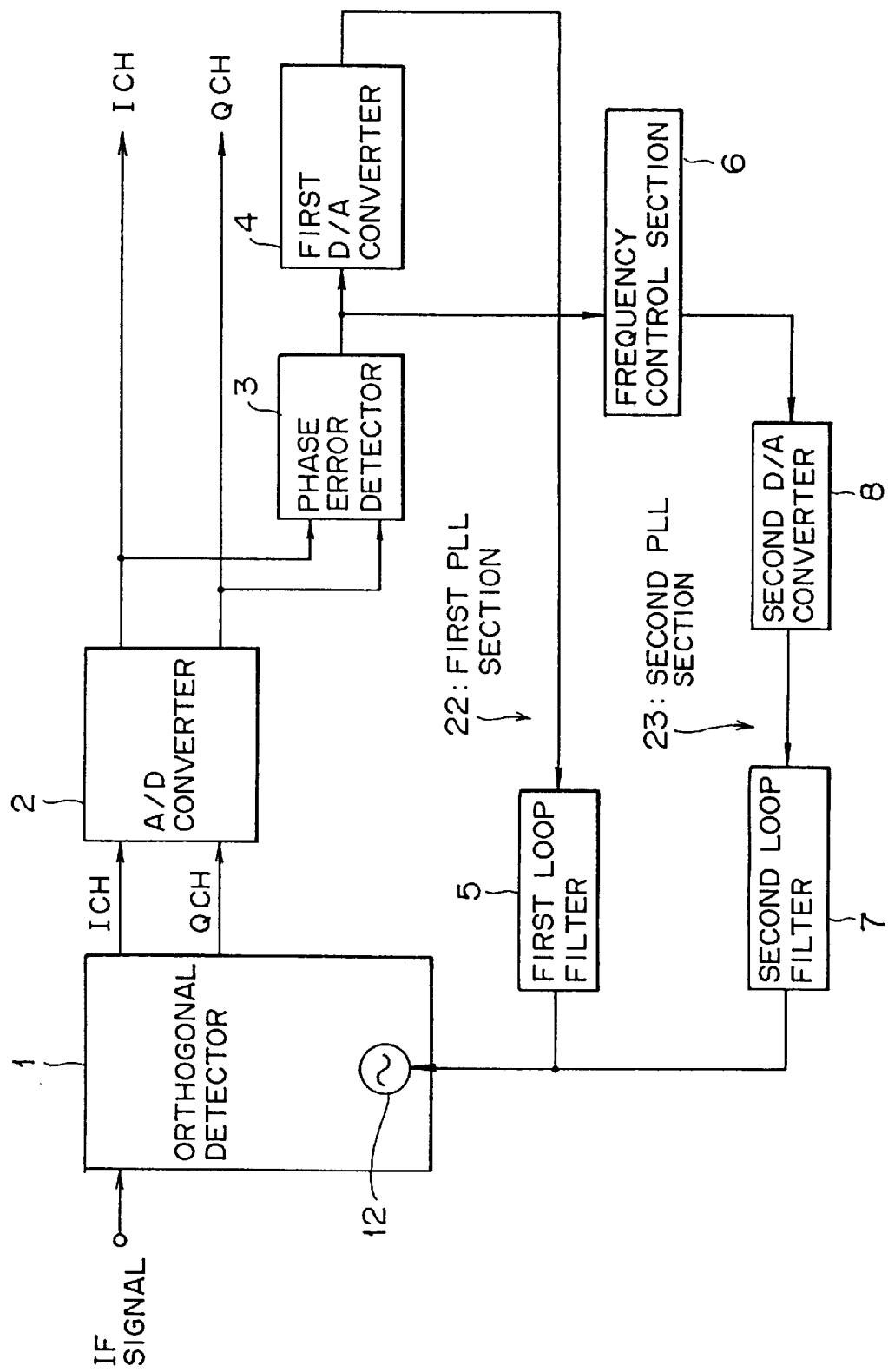
FIG. 2 is a block diagram showing an aspect of the present invention.

FIG. 2 is a block diagram showing the aspect of the present invention. Referring to FIG. 2, the carrier regenerating circuit consists of an orthogonal detector 1, an A/D converter 2, a phase error detecting section 3, a first D/A converter 4, a first loop filter 5, a frequency control section 6, a second loop filter 7, and a second D/A converter 8.

The orthogonal detector 1 detects an intermediate-frequency signal using the local oscillator 12 and then outputs detection signals perpendicular to each other. The A/D converter 2 A/D converts the detected signal detected by the orthogonal detector 1. The phase error detecting section 3 detects phase error information after the A/D conversion by the A/D converter 2.

The first D/A converter 4 D/A converts the phase error information detected by the phase error detecting section 3. The first loop filter 5 filters the phase error information after the D/A conversion by the first D/A converter 4.

Numeral 22 represents a first PLL section. The first PLL section 22 includes the first loop filter 5. The first PLL section 22 returns phase error information to the local oscillator 12 via the first loop filter 5.

Further, the frequency control section 6 updates a frequency control signal for the local oscillator 12 based on the phase error information when power set-up information is received or while a mark ratio due to the phase error information is not within a predetermined range, whereas halts the updating operation for generation of a frequency control signal when the mark ratio is within the predetermined range or when out-of-synchronization information is received.

The second D/A converter 8 converts the frequency control signal from the frequency control section 6 into an analog form. The second loop filter 7 filters the frequency control signal after the D/A conversion by the second D/A converter 8.

Numeral 23 represents a second PLL section. The second PLL section 23 includes the frequency control section 6 and the second loop filter 7. The frequency control section 6 executes an updating operation when the power set-up information is received or the mark ratio is not within the predetermined range. After an updating operation for the frequency control signal generation is halted when the mark ratio is within the predetermined range or when out-of-synchronization information is received, the frequency control signal from the frequency control section 6 is fed back to the local oscillator 12 via the second loop filter 7.

According to the carrier regenerating circuit of the present invention, the frequency control section 6 monitors whether or not a mark ratio deviates from a predetermined range, based on phase error information from the phase error detecting section 3. When the mark ratio is not within the predetermined range, the frequency control signal from the frequency control section 6 is fed back to the local oscillator 12 of the orthogonal detector by performing an updating operation by the frequency control section 6. Hence the advantage is that degradation in error rate can be prevented because the steady-state phase error can be suppressed by quickly matching a shift between a transmission frequency and the frequency of a regenerated carrier.

According to the present invention, since the local oscillator 12 can be automatically adjusted in a free-run mode, the sweep operation is not needed upon a normal use, so that the resynchronizing time can be reduced. This feature enables the performance of the carrier regenerating circuit and the quality of the whole radio equipment to be improved.

The phase error information to be input to the frequency control section 6 is preferably a polarity bit. The phase error information to be input to the frequency control section 6 is preferably a polarity bit and an error bit.

According to the present invention, when the phase error information input to the frequency control section 6 is the polarity bit, the carrier regenerating circuit can easily make an error judgment (+, −), thus generating a frequency control signal without complicating the circuit configuration.

Further, when the phase error information includes an error bit in addition to the polarity bit, the carrier regenerating circuit can grasp in more detail the degree of a distance between signal points (error judgment: +, −), thus improving the accuracy thereof.

(b) Explanation of an Embodiment of the Present Invention:

Next, an embodiment of the present invention will be described below by referring to the attached drawings.

Figure 3:
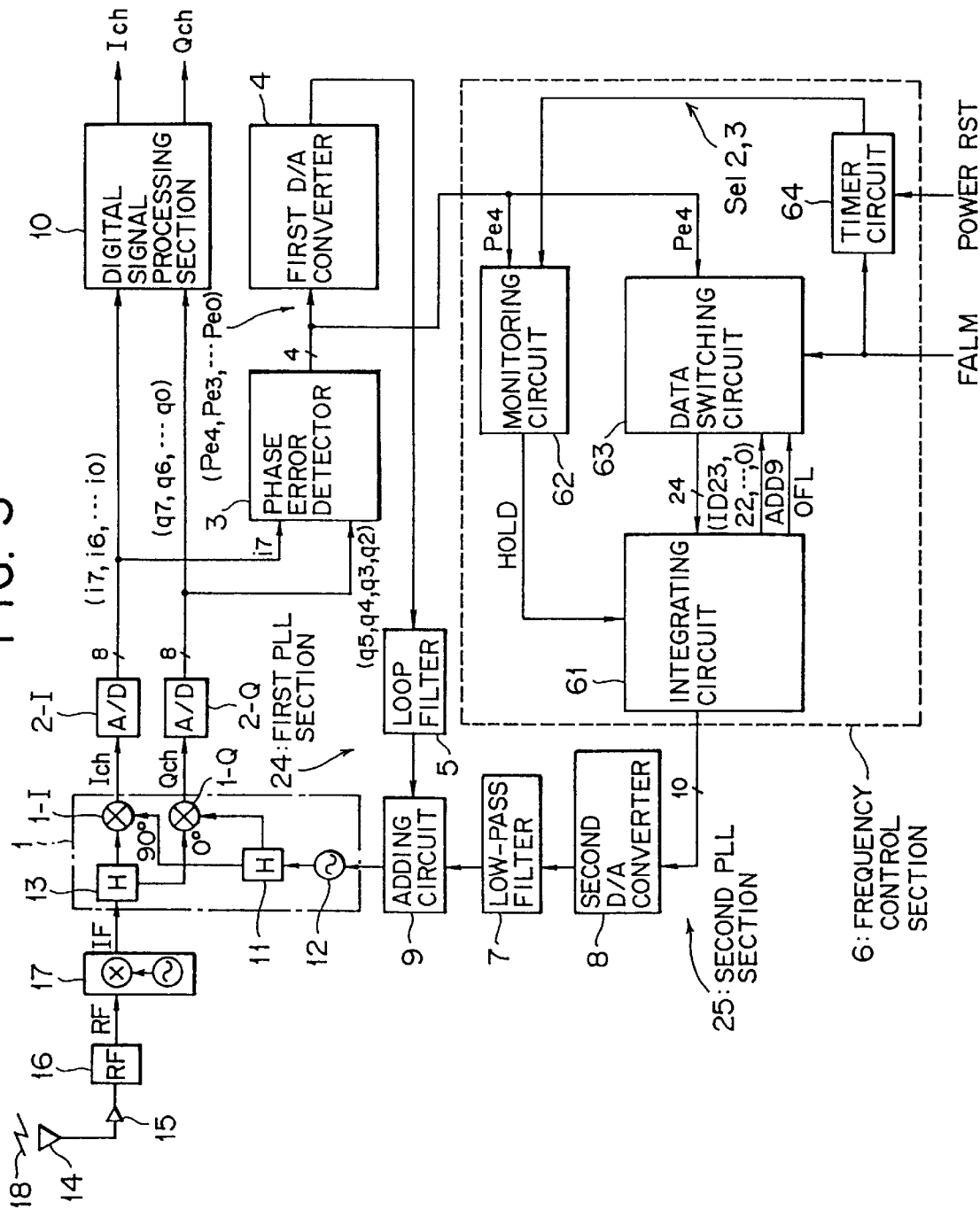
FIG. 3 is a block diagram showing the configuration of a carrier regenerating circuit according to an embodiment of the present invention.

FIG. 3 shows a receiving-side radio equipment mounting a carrier regenerating circuit according to an embodiment of the present invention. The carrier regenerating circuit shown in FIG. 3 is applicable to a demodulating section that demodulates receive signals according to many-valued QAM modulation system such as 64-value or more QAM modulation system.

Referring to FIG. 3, numeral 14 represents an antenna which receives a transmission signal from transmission-side radio equipment (not shown) via a radio trunk 18. Numeral 15 represents a low-noise amplifier which amplifies low noises included in the receive signal from the antenna 14. Numeral 16 represents a receive filter which extracts only a receive RF signal (radio frequency signal) by removing unwanted noises. Numeral 17 represents a down-converter which frequency-converts the receive RF signal from the receive filter 16 into an intermediate-frequency signal (IF signal) using an LO signal (local signal).

The carrier regenerating circuit according to the present invention is applied to a demodulator in a receiving-side radio equipment and then regenerates a carrier signal in a synchronous detection system, based on an IF signal (intermediate-frequency signal) from the down-converter 17.

Referring to FIG. 3, the carrier regenerating circuit consists of an orthogonal detecting circuit 1 having detecting circuits (mixing circuits) 1-I and 1-Q, a 90° hybrid (H) 11, a voltage controlled oscillator (VCO) 12 and a hybrid (H) 13; an analog/digital (A/D) converting circuits 2-I and 2-Q; a phase error detector 3; a first digital/analog (D/A) converter 4; a loop filter 5, a frequency control section 6; a low-pass filter 7; a second digital/analog (D/A) converter 8; an adding circuit 9 and a digital signal processing section 10.

In the present embodiment, the first PLL section 24 is formed of the orthogonal detecting circuit 1, the A/D converting circuits 2-I and 2-Q, the phase error detector 3, the first D/A converter 4 and the loop filter 5. The second PLL section 25 is formed of the orthogonal detecting circuit 1, the phase error detecter 3, a frequency control section 6, the second D/A converter 8, and the low-pass filter 7.

In the orthogonal detecting circuit (orthogonal detector) 1, the voltage controlled oscillator 12 regenerates a frequency signal (a regenerated carrier signal) in synchronous with an input signal and then outputs the outcome to the 90° hybrid 11. The 90° hybrid 11 outputs a regenerated carrier signal from the voltage controlled oscillator 12 to the detecting circuit 1-I while it outputs a signal having a phase difference of 90° with respect to the regenerated carrier signal to the detecting circuit 1-Q.

The hybrid 13 branches the many-valued orthogonal amplitude modulation signal (many-valued QAM signal) acting as the receive signal down-converted into an IF signal at the front stage in two. The detecting circuits 1-I and 1-Q output two series (Ich and Qch) of base band signals (orthogonal detection signals), respectively. The detecting circuit 1-I performs orthogonal detection (synchronous detection) by multiplying (mixing) an input signal output from the hybrid 13 by a regenerated carrier signal (local signal) with a certain phase angle supplied from the voltage controlled oscillator 12 via the 90° hybrid 11, thus outputting the base band signal (orthogonal detection signal) (Ich). The detecting circuit 1-Q performs orthogonal detection (synchronous detection) based on the regenerated carrier signal by multiplying (mixing) the input signal output from the hybrid 13 by a regenerated carrier signal (local signal) shifted by 90° to the generated carrier signal supplied from the voltage controlled oscillator 12 via the 90° hybrid 11, thus outputting the base band signal (orthogonal detection signal) (Qch).

In such an arrangement, the orthogonal detecting circuit 1 can obtain two series of base band signals (orthogonal detection signals) perpendicular to each other by performing a synchronous detection (orthogonal detection) of many-valued QAM signal (IF signal) input based on the regenerated carrier signal supplied from the voltage controlled oscillator 12 via the 90° hybrid 11.

The A/D converting circuit (analog/digital converter) 2-I digital-converts the base band signal (analog output) detected by the orthogonal detecting circuit 1. The A/D converting circuit (analog/digital converter) 2-Q digital-converts the base band signal (analog output) detected by the orthogonal detecting circuit 1. For example, as shown in FIG. 3, the orthogonal detection signals from the orthogonal detecting circuit 1 are converted into a 8-bit I-channel signals ($i_7$, $i_6$, . . . , $i_0$) and a 8-bit Q-channel signals ($q_7$, $q_6$, . . . , $q_0$), respectively.

The digital signal processing section 10 subjects the digital signals ($i_7$ to $i_0$) from the A/D converting circuit 2-I and the digital signals ($q_7$ to $q_0$) from the A/D converting circuit 2-Q to a necessary demodulating process such as an amplitude equalizing process and then outputs demodulation signals. Specifically, the digital signal processing section 10 generates a frame alarm signal (FALM) when the input signal (many-valued QAM signal) loses synchronization with the regenerated carrier.

Of those signals, a polarity bit $i_7$ (or $q_7$) as well as error bits $q_5$ to $q_2$ (or $i_5$ to $i_2$) corresponding to the distance to the signal point are input to the phase error detecting circuit 3. The bit $i_7$ of the I-channel and the bit $q_7$ of the Q-channel are used as a polarity bit and a signal bit.

Moreover, the phase error detecting circuit (phase error detecting section) 3 detects phase error information based on the detection signal after an analog to digital conversion by each of the A/D converting circuits 2-I and 2-Q, or outputs, in concrete, bit information corresponding to the distance to the signal point of a detection signal as phase error information.

Figure 4:
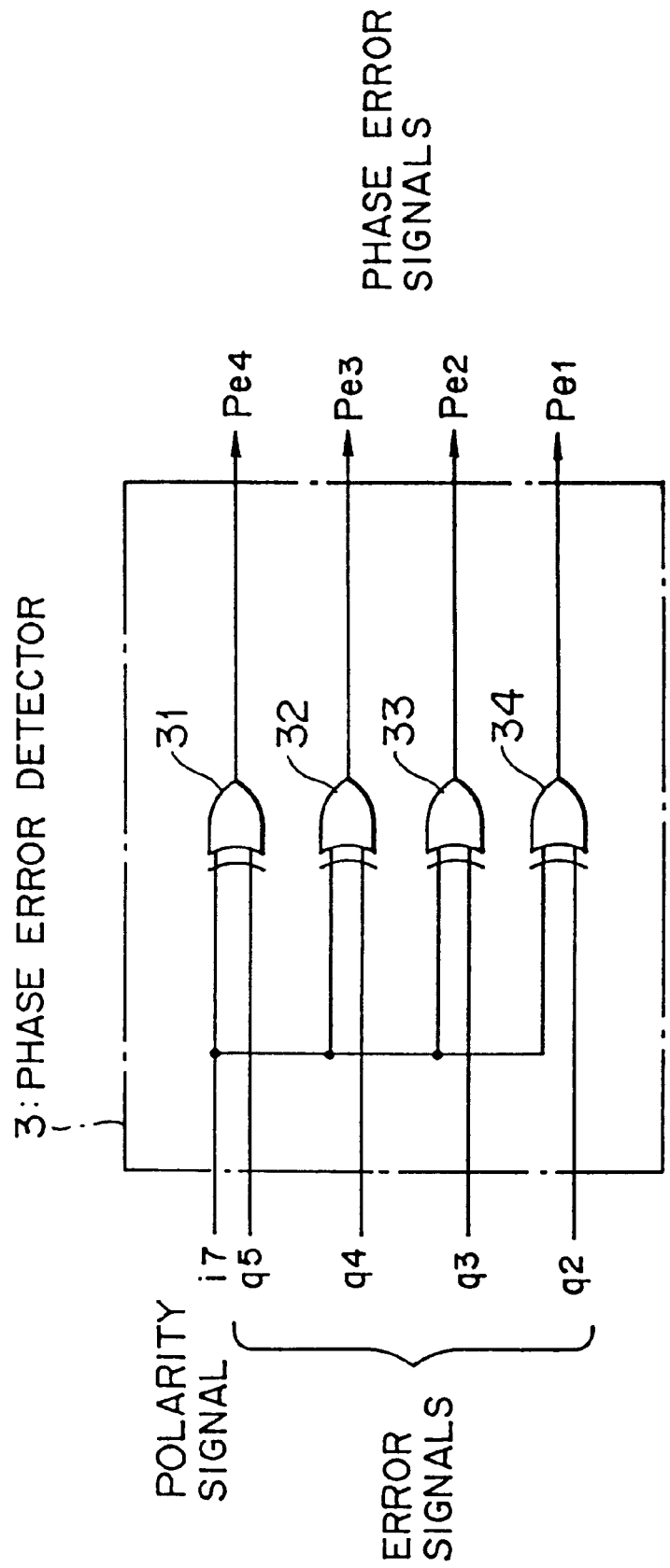
FIG. 4 is a block diagram showing the configuration of a phase error detecting circuit according to the embodiment of the present invention.

For example, in the 16-value QAM modulation system, as shown in FIG. 4, logical circuits (EXOR: exclusive OR circuits) 31 to 34 produce the phase error signals $P_{e4}$ to $P_{e1}$ respectively by subjecting the polarity bit (polarity signal) $i_7$ of the I-channel signal and each of error bits (error signals) of the Q-channel signal to an exclusive OR arithmetic operation. The phase error signal $P_{e4}$ is a plarity bit.

The first D/A converting circuit (first D/A converter) 4 analog-converts the phase error information (digital signals) $P_{e4}$ to $P_{e1}$ detected by the phase error detecting circuit 3. The loop filter (first loop filter) 5 filters phase error information after a digital to analog conversion by the first D/A converter 4.

Furthermore, the frequency control section 6 updates a frequency control signal for the voltage-controlled oscillator 12 based on the phase error information $P_{e4}$ when power set-up information is received or while a mark ratio [the ratio of High to Low (50:50 at synchronous state): control of the clockwise direction and counterclockwise direction of a signal point] due to the phase error information is not within a predetermined range, whereas halts an updating operation for generation of a frequency control signal when the mark ratio is within the predetermined range or while out-of-synchronization information (frame alarm signal) has been received. In the present embodiment, as shown in FIG. 3, the frequency control section 6 consists of, for example, an integrating circuit 61 (to be described later), a monitoring circuit 62, a data switching circuit 63 and a timer circuit 64, (to be described later).

Next, the second D/A converting circuit (second D/A converter) 8 D/A converts frequency control signals (ADD9, ADD8, . . . , ADD1, ADD0) output from the frequency control section 6. The low-pass filter (second loop filter) 7 filters the frequency control signal after a digital to analog conversion by the second D/A converter 8.

The adding circuit 9 adds the phase control signal (voltage signal) from the loop filter 5 to the frequency control signal output from the frequency control section 6 via the second D/A converter 8 and then outputs the result to the voltage controlled oscillator 12.

Hence, the first PLL section 24 includes at least a loop filter 5 and A/D converting circuits 2-I and 2-Q to return phase error information to the voltage controlled oscillator 12 via the loop filter 5.

Similarly, the second PLL section 25 includes at least a frequency control section 6, a second D/A converter 8, and a low-pass filter 7. The frequency control section 6 executes an updating operation when the power set-up information is received or when the mark ratio is not within the predetermined range. The frequency control signal from the frequency control section 6 is fed back to the voltage controlled oscillator 12 via the low-pass filter 7 by halting an updating operation for the frequency control signal generation when the mark ratio is within the predetermined range or when out-of-synchronization information is received.

Figure 5:
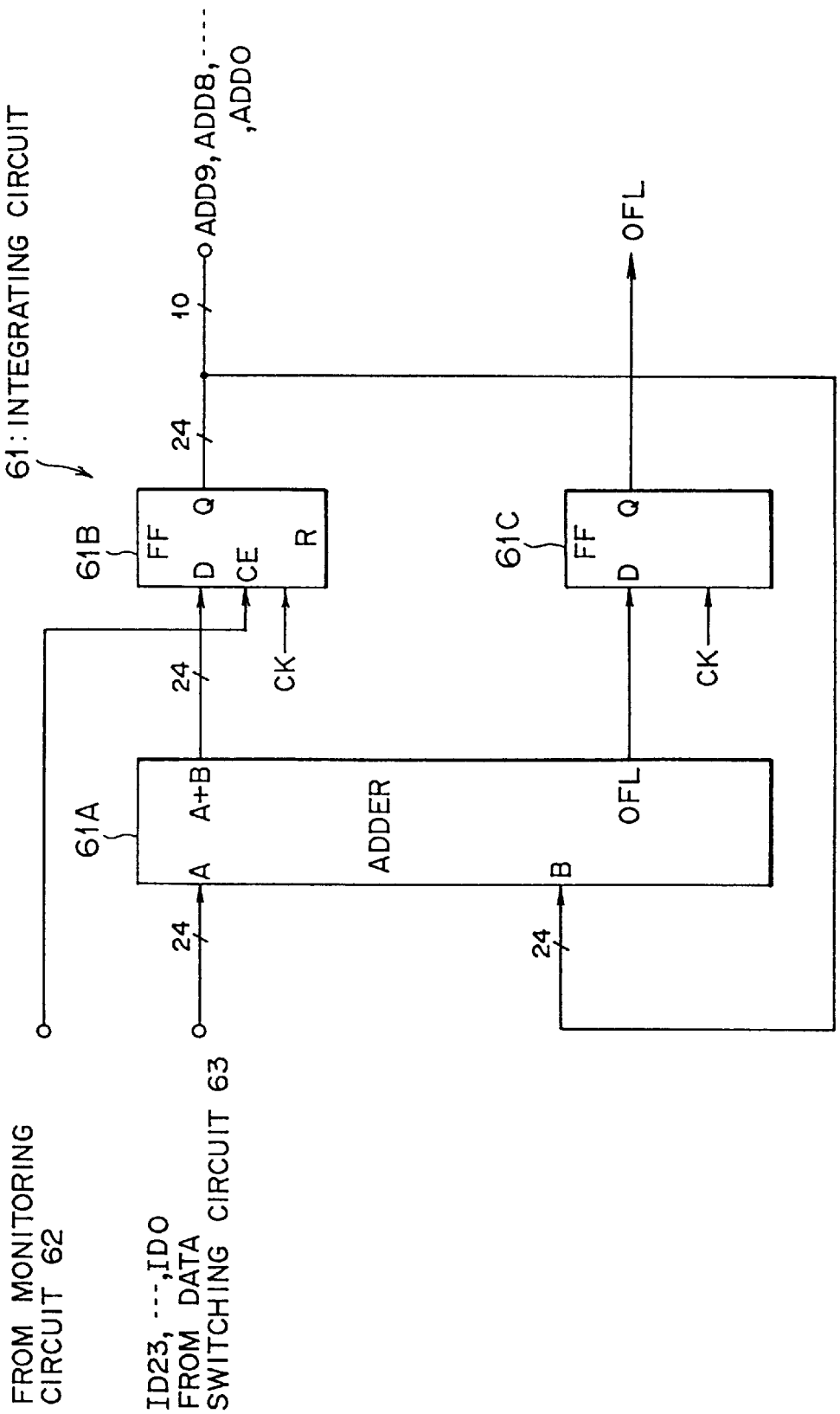
FIG. 5 is a block diagram showing the configuration of an integrating circuit according to the embodiment of the present invention.

In the frequency control section 6, the integrating circuit 61, which integrates phase error information, adds the past data input just before to the current data. As shown in FIG. 5, the integrating circuit 61, for example, is formed of an adder 61A, latch circuits (FFs) 61B and 61C.

The adder 61A adds cumulatively phase error information (ID23, ID22, . . . , ID1, ID0) from the data switching circuit 63 (to be described later) and then outputs the result via the latch circuit 61B. The data including upper 10-bits (ADD9, ADD8, . . . ADD0) of the updated data is selectively output to the second D/A converter 8 at the rear stage.

When all the 24-bit data (ID23 to ID0) become 1s or 0s as a result of the cumulative addition, the adder 61A outputs an overflow signal (OFL).

Moreover, the latch circuit (accumulator) 61B updates or holds selectively the cumulative result from the adder 61A. In response to an "H" level signal as information from the monitoring unit 62 (to be described later), the latch circuit 61B holds temporarily the output from the adder 61A and then updates the cumulative result. In response to a hold signal (HOLD; "L" level signal), the latch circuit 61B halts the updating operation.

The latch circuit 61C holds temporarily an overflow signal output from the adder 61A. The overflow signal is output in synchronous with data from the latch circuit 61B.

As described above, in the integrating circuit 61, the adder 61A, for example, adds sequentially and cumulatively data ID23, ID22, . . . , ID1, ID0 from the data switching circuit 63 to the past addition result (A+B) temporarily held in the latch circuit 61B, thus updating the data on occasion.

In the integrating circuit 61, an addition halt signal (HOLD; a hold signal, an integrating operation halt signal) from the monitoring circuit 62 is received, the adder 61A halts its adding operation. Then, data held in the latch circuit 61B before receiving the addition halt signal is output to the second D/A converting circuit 8 at the rear stage.

Figure 6:
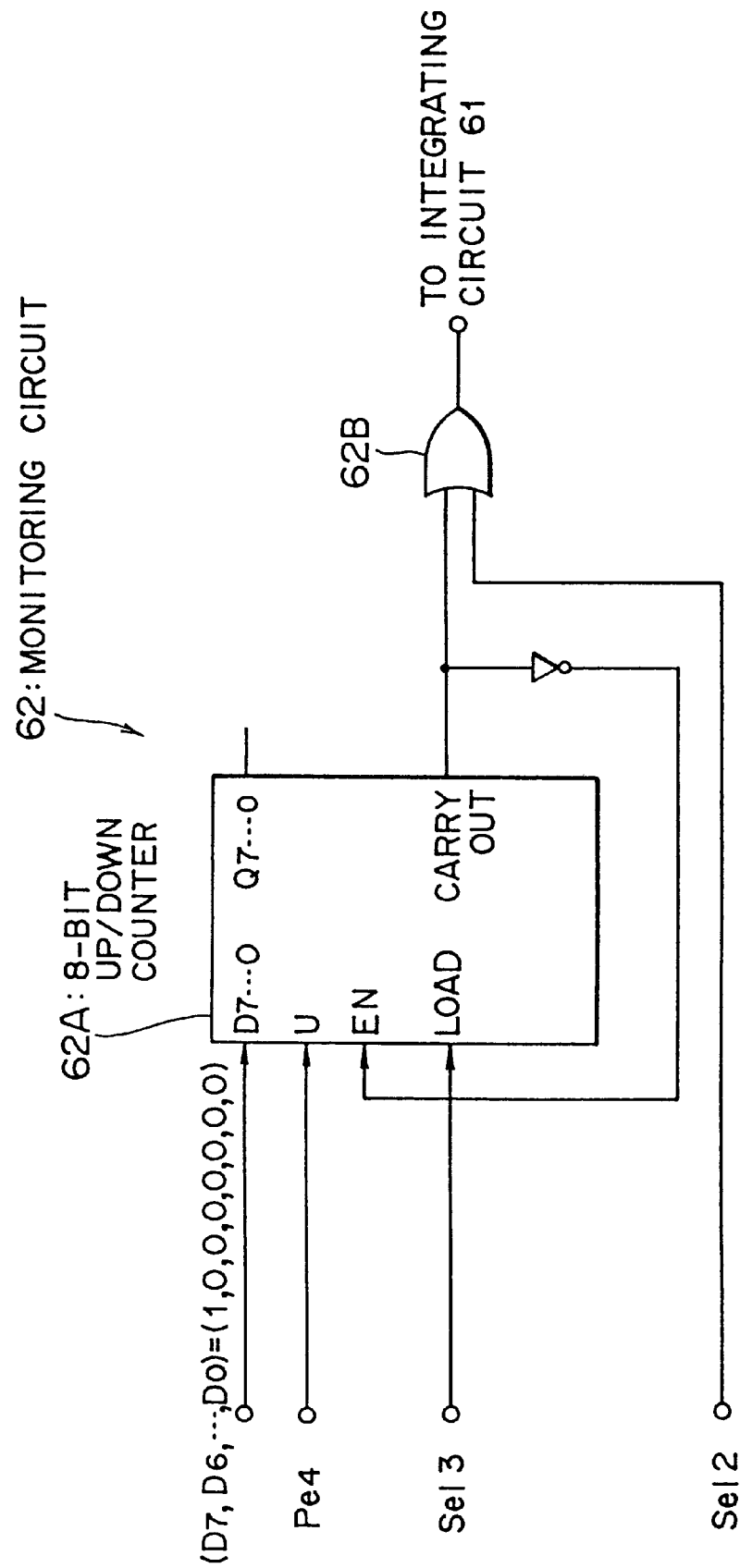
FIG. 6 is a block diagram showing the configuration of a monitoring circuit according to the embodiment of the present invention.

The monitoring circuit 62 monitors whether or not the mark ratio has deviated from a predetermined range, to halt the integrating operation of the integrating circuit 61 while the mark ratio is within the predetermined range, and to start the integrating operation of the integrating circuit 61 when the mark ratio deviates from the predetermined range. As shown in FIG. 6, the monitoring circuit 62 is, for example, formed of a counting circuit (8-bit up/down counter) 62A and a logical circuit 62B.

The counting circuit 62A up/down counts the phase error information and then generates a hold signal (an "L" level signal) while the mark ratio is within the predetermined range while it generates an integrating operation permission signal (an "H" level signal) when the mark ratio is not within the predetermined range.

In concrete, the counting circuit 62A up/down counts the phase error information $P_{e4}$ (a polarity bit) from the phase error detecting circuit 3 based on the signal (Sel3; refer to ② in FIG. 9) output periodically (e.g. every 1024 clock rates) from the timer circuit 64 (to be described later). When the Sel3 signal is loaded (LOAD), a count value is set to an initial set value, so that the counting circuit 62A starts its up/down counting operation. That is, the mark ratio can be accurately monitored by periodically starting the up/down counting operation.

8-bit binary data (D7 to D0), for example, is set as the initial set value (1, 0, . . . , 0; "128" in decimal notation). The upper limit overflow value is set to (1,1, . . . , 1; "256" in decimal notation) while the lower limit overflow value is set to (0, 0 , . . . , 0; "0" in decimal notation). The up/down counting operation is performed within a range extending from the initial set value to the upper or lower limit overflow value.

That is, the counting circuit 62A judges whether or not the mark ratio deviates from a predetermined range by setting an up/down count value of the phase error information $P_{e4}$ as an equivalent value. As a result of the up/down counting operation, while the mark ratio does not deviate from a predetermined range (within 0 to 256), the integrating circuit 61 halts its integrating operation, so that data stored in the integrating circuit 61 is held.

On the other hand, when the mark ratio deviates from the predetermined range (or the up/down count is less than "0" or more than "256"), the carry-out signal (Carry out; an "H" level signal) is issued. When the carry-out signal is output, it is inverted. Then the inverted carry-out signal is input to the enable (EN) terminal of the counting circuit 62A. Thus the counting circuit 62A halts its up/down counting operation of the phase error information $P_{e4}$. In this case, the counting circuit 62A outputs continuously the carry-out signal until it receives the next LOAD.

In concrete, the carry-out signal is output when there are 576 or more phase error signals with positive or negative polarities among 1024 phase error signals $P_{e4}$ input during a chain of 1024 clock pulses (or the difference between positive polarity bits and negative polarity bits is 128 or more), that is, when the ratio of the positive polarity bits to the negative polarity bits is 576:448 (or 448:576) or more. When the ratio is less than the above-mentioned value (or closer to 5:5 than 576:448 [or 448:576], the carry-out signal is not output.

The monitoring circuit 62 monitors whether or not the mark ratio has deviated from a predetermined range, to halt the integrating operation of the integrating circuit 61 while the mark ratio is within the predetermined range and to start the integrating operation of the integrating circuit 61 when the mark ratio deviates from the predetermined range. The monitoring circuit 62 also monitors whether or not out-of-synchronization information has been detected based on the FALM from the digital signal processing section 10, and halts the operation of the integrating circuit 61, regardless of the value of the mark ratio, when out-of-synchronization information is detected.

Figure 9:
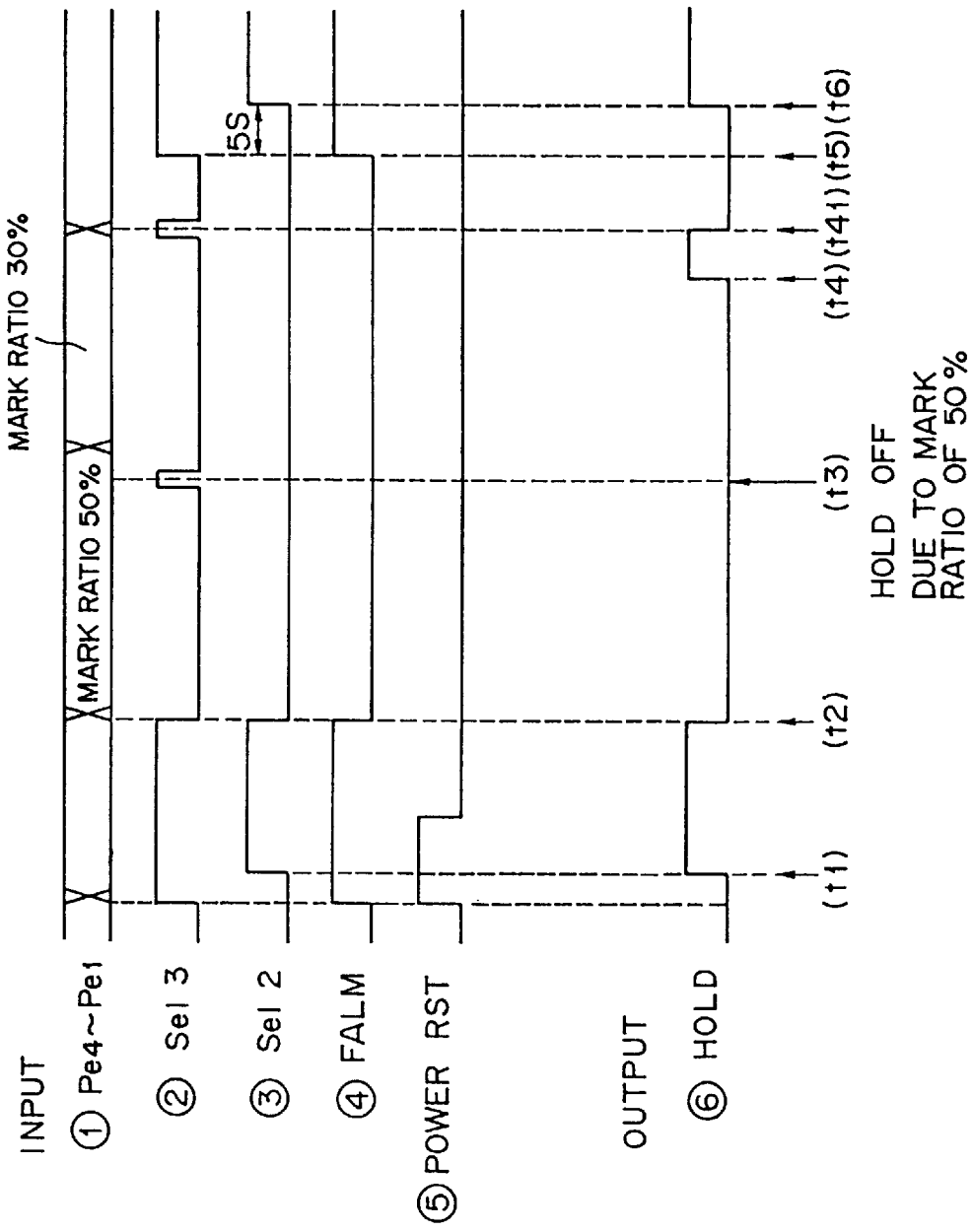
FIG. 9 is a time chart for explaining the operation of a carrier regenerating circuit according to the embodiment of the present invention.

In other words, as shown, for example, with the timechart in FIG. 9, the monitoring circuit 62 halts the integration operation of the integrating circuit 61 (or outputs a hold signal) while the mark ratio is within a predetermined range or when out-of-synchronization information is received (refer to the time t2 to t4 and the time t5 to t6 in the state ⑥ shown in FIG. 9). The monitoring circuit 62 also starts an operation of the integrating circuit 61 when power set-up information (pulse width information) is received or when the mark ratio derives from the predetermined range (refer to the time t1 to t2 and the time t4 to t41 in the state ⑥ shown in FIG. 9).

That is, the timer circuit 64 outputs the Se13 signal periodically and even at the time at which data is out-of-synchronization. In the monitoring circuit 62, the counting circuit 62A receives the Se13 signal at the time of out-of-synchronization, regardless of the timing of the signal output periodically, and then resumes its up/down counting operation. That is, in this case, the integrating circuit 61 halts its integrating operation, regardless of the value of the mark ratio.

In this case, the counting circuit 62A up/down counts the phase error information and then generates an integration operation halt signal while the mark ratio is within a predetermined range or when out-of-synchronization information is detected, and generates an integrating operation permission signal when the mark ratio deviates from the predetermined range.

The logical circuit 62B is formed as an OR (logical add) circuit. The logical circuit 62B executes an OR operation of a carry-out signal from the counting circuit 62A (or a signal issued when the mark ratio deviates from a predetermined range) and a signal (Se12) from the timer circuit 64 (to be described later). The logical circuit 62B outputs a signal (an integrating operation halt signal) for halting an adding operation in the integrating circuit 61 when the result of the OR operation is "0", whreas outputs a signal (an integrating operation permission signal) permitting the adding operation in the integrating circuit 61 when the result of the OR operation is "1".

That is, the monitoring circuit 62 monitors to halt the integrating operation of the integrating circuit 61 with timing of a constant period (periodically) while the mark ratio is within a predetermined range, and to start the integrating operation of the integrating circuit 61 when the mark ratio deviates from the predetermined range. Hence, if necessary, the second PLL section 25 can be operated without affecting the frequency control operation under the frequency control by the first PLL section 24.

As described above, when out-of-synchronization information is detected, the integrating operation of the integrating circuit 61 can be halted. In this case, as described later, when a predetermined period of time (e.g. about 5 seconds) has passed after detection of out-of-synchronization information, the integrating operation of the integrating circuit 61 is resumed.

In such an operation, when the counting circuit 62A is loaded to the terminal LOAD with the timing of a constant period, the monitoring circuit 62 up/down counts the phase error information $P_{e4}$. Then, as a result of the up/down counting operation, while the mark ratio is within a predetermined range, the carry-out signal is not output, so that the input of the logical circuit 62B becomes an L level state (=0). As described later, since the other input of the logical circuit 62B becomes an L level state, when there is no integrating operation permission condition other than deviation of the mark ratio, the integrating operation is halted based on the signal from the timer circuit 64.

On the other hand, when the mark ratio deviates from the predetermined range, a carry-out signal is issued, thus making the input of the logical circuit 62B an H-level state (=1). As a result, the operation of up/down counting of the phase error information $P_{e4}$ is halted to start the integrating operation.

In the frequency control section 6, when the mark ratio deviates from the predetermined range based on the signal from the monitoring circuit 62, the integrating circuit 61 generates the frequency control signal for the voltage controlled oscillator 12 through an updating operation, based on the phase error information. When the mark ratio is within the predetermined range or out-of-synchronization information is received based on the signal from the monitoring circuit 62, the integrating circuit 61 also halts its updating operation for the generation of a frequency control signal.

Similarly, since the input of the logical circuit 62B becomes an H-level state (=1) at the time of power set-up, the integrating operation is performed. When the out-of-synchronization is received, the integration operation is halted regardless of the value of the mark ratio.

Figure 7:
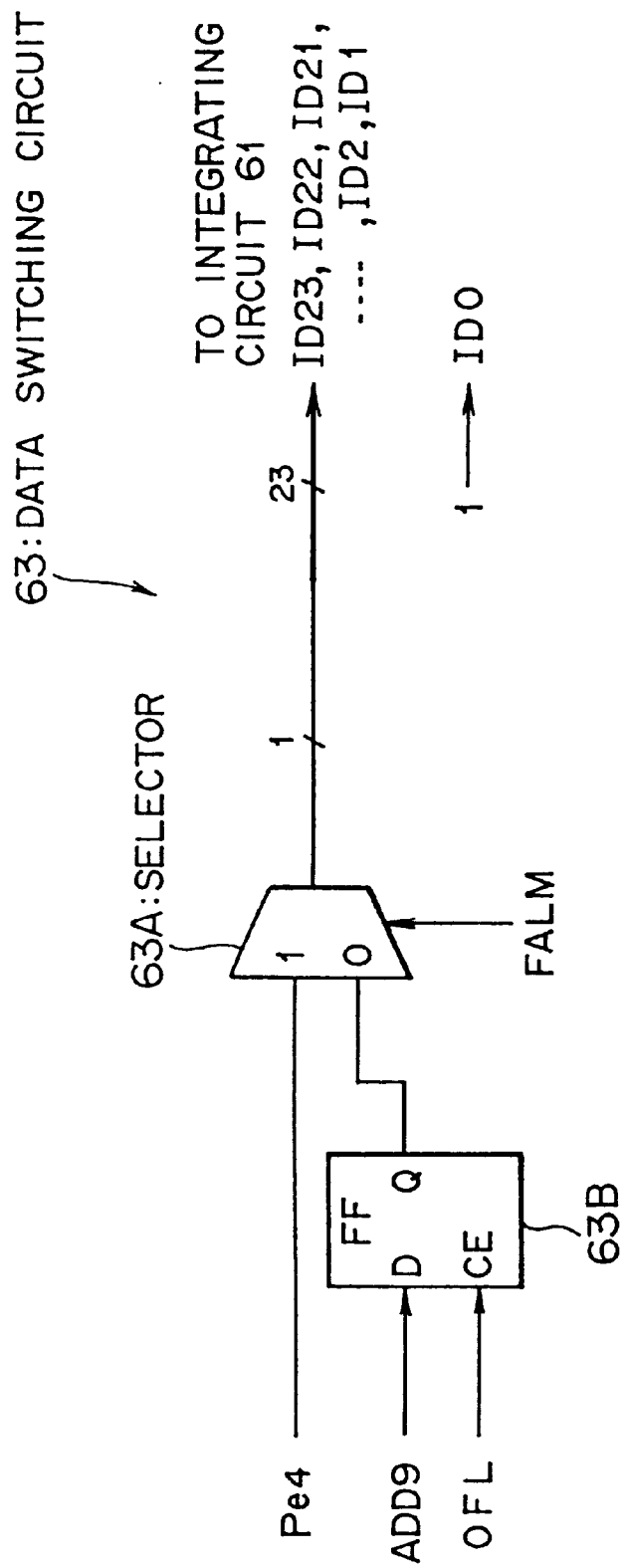
FIG. 7 is a block diagram showing the configuration of a data switching circuit according to the embodiment of the present invention.

The data switching circuit 63 switches (generates) the phase error information $P_{e4}$ from the phase error detector 3 to a signal (24-bit signals) suitable for inputting to the integrating circuit 61 at the rear stage, based on the frame alarm signal as out-of-synchronization information from the digital signal processing section 10, and then outputs it. As shown in FIG. 7, the data switching circuit 63, for example, is formed of a selector 63A and a latch circuit (FF) 63B.

The selector 63A outputs selectively the phase error information $P_{e4}$ from the phase error detecting circuit 3 or the output from the latch circuit 63B. The selector 63A is switched by out-of-synchronization information from the digital signal processing section 10.

In concrete, when not receiving out-of-synchronization from the digital signal processing section 10, the selector 63A outputs selectively the phase error information $P_{e4}$. When receiving out-of-synchronization information, the selector 63A outputs selectively data from the latch circuit 63B.

In the output operation to the integrating circuit 61, the data (1 bit) output from the selector 63A is expanded (branched) to 23-bit data (ID23, ID22, . . . , ID1) while 24 bits formed of the 23 bits and the least significant bit (ID0=1 fixed) are output to the integrating circuit 61.

That is, when the selector 63A outputs "1", a 24-bit signal [(ID23, ID22, . . . , ID1, ID0)=(1, 1, . . . , 1, 1); "−1" in decimal notation] is output to the integrating circuit 61. At the same time, when the selector 63A outputs "0", 24-bit signals [(ID23, ID22, . . . , ID1, ID0)=(0, 0, . . . , 0, 1); "+1" in decimal notation] is output to the integrating circuit 61.

The latch circuit 63B latches the value [the most significant bit (ADD9=1 when all 24 bits are "1"; ADD9=0 when all 24 bits are "0")] obtained when the addition state is overflown in the integrating circuit 61 (when an overflow signal is input), based on the overflow signal (OFL). The latch circuit 63B also produces a triangular wave by returning the output data from the integrating circuit 61 when the situation is not recovered after a predetermined time in response to out-of-synchronization information.

That is, in response to the overflow signal as an enable signal, when the latch circuit 63B is latched the most significant bit ADD9="1", data (−1 in decimal notation) representing (ID23, ID22, . . . , ID1, ID0)=(1, 1, . . . , 1, 1) is output to the integrating circuit 61. When the least significant bit (ADD0=−1) is latched in response to the overflow signal, data (1 in decimal notation) representing (ID23, ID22, . . . , ID1, ID0)=(0, 0, . . . , 0, 1) is output to the integrating circuit 61.

As described later, when the situation is not recovered after a predetermined time in response to the out-of-synchronization information, the integrating circuit 61 becomes an enable state by the integrating operation permission signal from the monitoring circuit 62. The integrating circuit 61 adds (or subtracts) cumulatively data from the latch circuit 63B to the current value, thus finally producing a triangular wave.

In other words, when the situation is not recovered after a predetermined period of time from the inputting of out-of-synchronization information to the selector 63A, the integrating circuit 61 produces a triangular wave by performing an integration operation using data from the latch circuit 63B. Sweep operation for substantially hunting a synchronous frequency can be performed by outputting the resultant triangular wave to the voltage controlled oscillator 12 via the second D/A converting circuit 8, the low-pass filter 7 and the adding circuit 9.

The timer circuit 64 generates periodically a carry-out signal. Further, the timer circuit 64 outputs an event signal to the monitoring circuit 62 when it receives power set-up information (POWER RST: power-on reset signal) and outputs an event signal to the monitoring circuit 62 after a predetermined time from detection of out-of-synchronization information.

Figure 8:
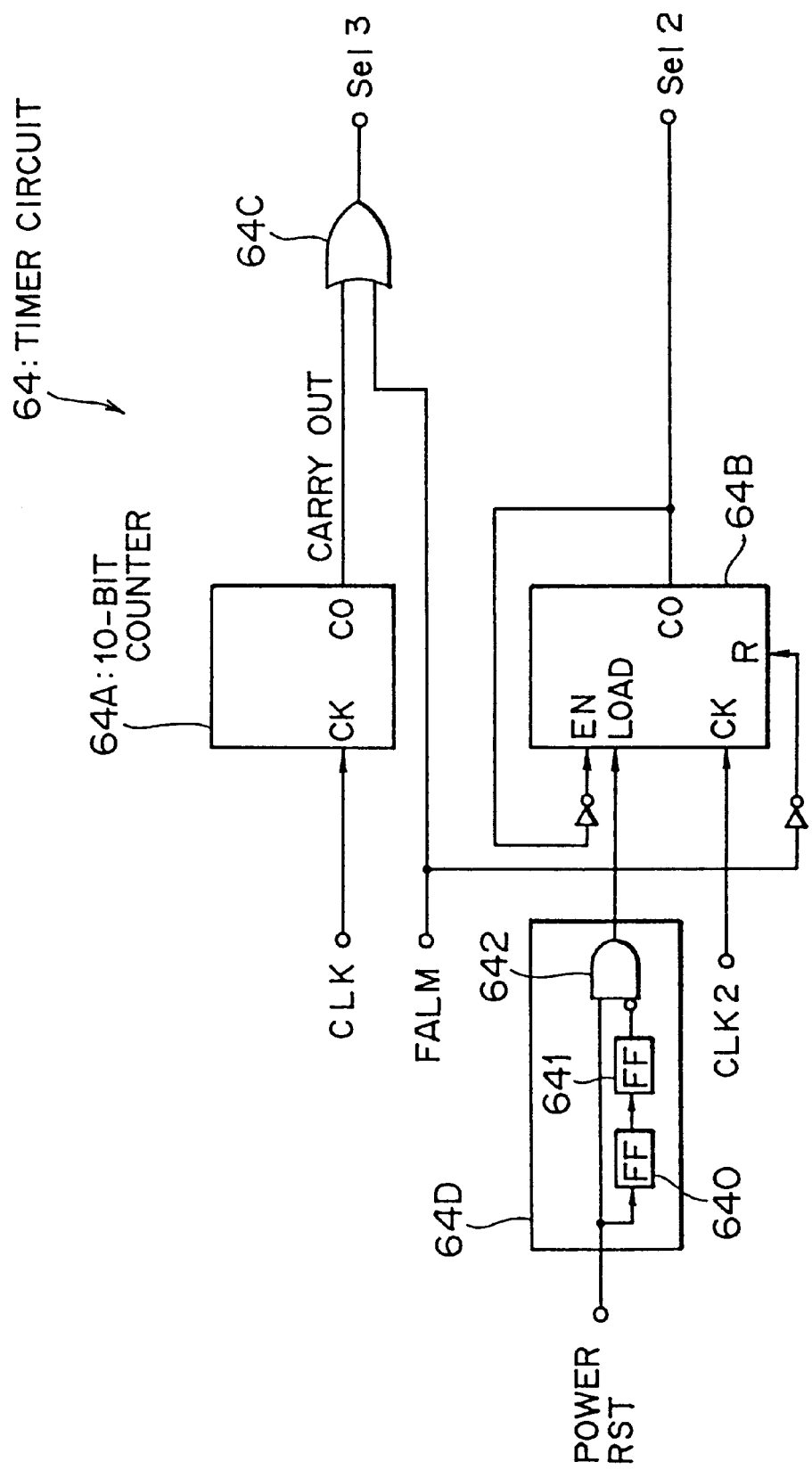
FIG. 8 is a block diagram showing the configuration of a timer circuit according to the embodiment of the present invention.

As shown in FIG. 8, the timer circuit 64, for example, consists of a first counter (10-bit counter) 64A, a second counter 64B, a logical circuit 64C and a power resetting section 64D.

The first counter 64A, which generates a carry-out signal based on a clock pulse (CLK), is formed of, for example, a 10-bit counter. That is, the first counter 64A generates a carry-out signal (Sel3) every time the count number reaches 1024 (② in FIG. 9).

The second counter 64B generates a signal (Sel2) based on a clock pulse (CLK2) different from the clock pulse output from the first counter 64A. The signal (Sel2) is reset (R) in response to out-of-synchronization information (FALM) (refer to ③ and the time (t5) in FIG. 9), thus interrupting the outputting of the Sel2 signal (the "L" level signal is output). At the same time, the second counter 64B reproduces the Sel2 signal (an H-level signal) with the clock pulses (CLK2) after several seconds (here, after 5 seconds) from the resetting time (refer to ③ and the time (t6) in FIG. 9).

That is, since a phenomenon such as fading which is recovered in a slight time often becomes a trunk deteriorating factor, a temporary out-of-synchronization may be automatically recovered to a synchronization state after waiting for constant intervals. Hence, the second PLL section 25 is set so as to interrupt its control upon detection of out-of-synchronization and then to resume it after 5 seconds. That is, when the signal (Sel2) is output after 5 seconds, the integrating circuit 61 operates as described above, so that the sweep operation is substantially performed to hunt the synchronous frequency.

When the power reset section 64D receives the power set-up information, the second counter 64B is loaded (LOAD), thus outputting the signal (Sel2). Then the inverted signal of the Sel2 signal is applied to the enable terminal (EN) of the second counter 64B.

The logical circuit 64C is formed as an OR (logical add) circuit. When either a carry-out signal from the first counter 64A is input or one of frame alarm signals representing out-of-synchronization information is set up by executing an OR operation of a carry-out signal from the first counter 64A (a periodically generated signal) and out-of-synchronization information (FALM), the logical circuit 64C outputs the signal (Sel3). In other words, when the out-of-synchronization information is detected, the logical circuit 64C outputs the Sel3 signal regardless of the timing of a carry-out signal from the first counter 64A.

The power reset section 64D outputs a signal representing a power set-up state to the counter 64B. The power reset section 64D is formed of latch circuits (FF) 640 and 641 and a logical circuit (one-inverted-input type OR circuit) 642. When the power is set up, the logical circuit 642 receives the power set-up signal to one terminal thereof and receives the signal inverted and delayed via the latch circuits 640 and 641 to the other terminal thereof.

The timer circuit 64 outputs periodically the carry-out signal (Sel3) and then updates (resets) monitoring data from the monitoring circuit 62 representing whether or not the mark ratio has been deviated from a predetermined range at constant intervals. Since the carry-out signal (Sel2) is immediately output upon power set-up, the integrating circuit 61 executes an integrating operation via the monitoring circuit 62.

When the data synchronization is deviated, the carry-out signal (Sel3) is output while the signal (Sel2) becomes an L-level signal. Thus, the integrating operation can be halted by resetting monitoring data from the monitoring circuit 62.

Hence, in response to power set-up information, the frequency control section 6 starts the updating operation for frequency control signal generation by operating the integrating circuit 61 by the integration operation permission signal from the monitoring circuit 62.

The operation of the whole demodulating section of the receiving-side radio equipment embodying the carrier regenerating circuit with the above-mentioned configuration according to the present invention will be briefly described below. As shown in FIG. 3, when orthogonally detecting the many-valued QAM signal as a receive signal based on the local signal (regeneration carrier signal) from the voltage controlled oscillator 12, the orthogonal detecting circuit 1 converts it into two series (Ich, Qch) baseband signals. The A/D converting circuits 2-I and 2-Q digital-convert the baseband signals, respectively. Then the digital signal processing section 10 subjects the resultant respective signals to an equalizing process and then outputs them as respective demodulated signals.

On the other hand, in the first PLL section 24, phase error information of the main signal of the Ich baseband signal is detected using an output from the A/D converting circuit 2-I while phase error information of the main signal of the Qch baseband signal is detected using an output from the A/D converting circuit 2-Q. A voltage control signal is generated based on the phase error information and then is fed back to the voltage controlled oscillator 12 in the orthogonal detecting circuit 1. Thus, the phase of a detection frequency in the orthogonal detecting circuit 1 is adjusted to an optimum value.

In concrete, in the first PLL section 24, the phase error detector 3 generates the phase error signals $P_{e4}$ to $P_{e1}$ by executing an exclusive logical add of a polarity signal $i_7$ of the Ich channel and error signals $q_5$ to $q_2$ of the Qch channel (refer to FIG. 4). Then the first D/A converting circuit 4 converts the phase error signals $P_{e4}$ to $P_{e1}$ into analog signals and then outputs them as a voltage control signal for the voltage controlled oscillator 12.

During a series of the phase adjusting steps of the first PLL section 24, the second PLL section 25 monitors a steady-state phase error by observing whether or not the mark ratio deviates from a predetermined range.

That is, when it is judged that the steady-state phase error becomes large based on the mark ratio, the second PLL section 25 adds a control amount (frequency control information) compensating the steady-state phase error to a phase error amount from the first PLL section 24. When the mark ratio is within the predetermined range, the second PLL section 25 does not execute frequency control.

For example, as shown with the timechart in FIG. 9, when synchronization is established, the monitoring circuit 62 monitors whether or not the mark ratio deviates from the predetermined range with the output (Pe4) of the phase error detector 3, based on the signal (Sel3) periodically output from the timer circuit 64. While the mark ratio is within the predetermined range, the integrating circuit 61 halts its integrating operation by outputting a hold signal ("L" level signal) (refer to as the time (t2) to (t4) in the state ⑥ in FIG. 9).

On the other hand, when the mark ratio is deviated from the predetermined range due to a steady-state phase error corresponding to the difference between the oscillation frequency (free running) of the voltage controlled oscillator 12 and the local frequency of an IF signal input from the orthogonal detecting circuit 1, the monitoring circuit 62 outputs an integrating operation permission signal ("H" level signal) to permit the integrating operation of the integrating circuit 61 regardless of establishment of synchronization. Then, of data (integration result) latched in the latch circuit 61B in the integrating circuit 61, the leading 10 bits (ADD9 to ADD0) are output as frequency control information to the second D/A converting circuit 8.

That is, the data switching circuit 63 converts the phase error signal $P_{e4}$ from the phase error detector 3 into data having the number of bits [24 bits (ID23, ID22, ..., ID1, ID0)] suitably input to the integrating circuit 61.

Thereafter, in the integrating circuit 61, the adder 61A adds cumulatively and sequentially data currently input to data ID23, ID22, ..., ID1, ID0 continuously input from the data switching circuit 63 and then outputs signal data formed of the upper 10 bits ADD9, ADD8, ..., ADD1, ADD0 as an addition result to the second D/A converting circuit 8.

The second D/A converting circuit 8 converts the input digital data ADD9, ADD8, ..., ADD1, ADD0 into analog data. Then low-pass filter 7 subjects the analog data to a loop filter process and then outputs the outcome as a frequency control signal to the adding circuit 9.

Thereafter, the adding circuit 9 adds the phase control signal (voltage signal) input from the first PLL section 24 via the loop filter 5 to the frequency control signal input from the second PLL section 25 via the low-pass filter 7 and then outputs the addition result to the voltage controlled oscillator 12. As a result, the steady-state phase error is suppressed by correcting the frequency deviation and phase deviation.

In addition, in the case of occurrence of out-of-synchronization, the digital signal processing section 10 at the rear stage recovers the out-of-synchronization by halting the frequency control operation by the second PLL section 25 and then performing only the phase control by the first PLL section 24.

When the out-of-synchronization cannot be recovered after a predetermined period of time from the detection thereof, a sweep operation for hunting the synchronization frequency can be substantially performed by returning a triangular wave generated by means of the combination of the integrating circuit 61 and the data switching circuit 63 to the voltage controlled oscillator 12.

That is, as shown with, for example, the timechart in FIG. 9, when occurrence of out-of-synchronization is detected in the digital signal processing section 10 (refer to ④ and the time (t5) in FIG. 9), the monitoring circuit 62 outputs a hold signal based on the signal (Sel3; ② in FIG. 9) output from the timer circuit 64, thus halting the integrating operation of the integrating circuit 61.

At this time, when the out-of-synchronization cannot be recovered even after a predetermined period (e.g. 5 seconds) from the detection thereof (refer to ③ and the time (t6) in FIG. 9), the data switching circuit 63 switches the data held in the integrating circuit 61 (ADD9=1 or ADD0=−1, switched by the set-up of an overflow bit) to data suitable for inputting to the integrating circuit 61 and then outputs it. Then the integrating circuit 61 subtracts or adds data according to the output switched.

In such a procedure, the frequency sweep operation is performed by generating and outputting a triangular wave by the integrating circuit 61 and then feeding back it to the voltage controlled oscillator 12.

Thereafter, when the receive many-valued QAM signal comes close to a synchronization establishment state according to the series of sweep operation described above, a stable condition can be obtained because of effectiveness of the output (voltage control signal) from the first PLL section 24.

When synchronization is not established even at the power set-up, the monitoring circuit 62 executes its integrating operation based on the signal (Sel2) from the timer circuit 64, because of issuance of out-of-synchronization information (refer to the time (t1) and the time (t2) in FIG. 9). Hence the frequency control process can be performed in the manner nearly identical to that in the case of the out-of-synchronization described above.

As described above, in the carrier regenerating circuit according to the embodiment of the present invention, the frequency control section 6 monitors whether or not a mark ratio deviates from a predetermined range, based on phase error information from the phase error detector 3. When the mark ratio is not within the predetermined range, the frequency control signal from the frequency control section 6 is fed back to the signal for the voltage-controlled oscillator 12 of the orthogonal detector 1 by forcing the frequency control section 6 to perform an updating operation. Hence the advantage is that a degradation in error rate can be prevented because the steady-state phase error can be suppressed by quickly recorrecting the shift in frequency between the transmission frequency and the regeneration frequency.

According to the carrier regenerating circuit, since the voltage-controlled oscillator 12 can be automatically adjusted in a free-run mode, the sweep operation is not needed upon a normal use, so that the resynchronizing time can be reduced. This feature enables the performance of the carrier regenerating circuit and the quality of the whole radio equipment to be improved.

Moreover, the integrating circuit 61 halts its integrating operation while the mark ratio is within the predetermined range. The integrating circuit 61 also starts its integrating operation when the mark ratio deviates from the predetermined range. Hence, the second PLL section 25 can be operated only when required without affecting the frequency control operation by the first PLL section 24, thus stably maintaining the frequency control process.

Furthermore, according to the present invention, when out-of-synchronization information is detected the integrating circuit 61 can halt its integrating operation regardless of the value of the mark ratio, so that the frequency just before the occurrence of the out-of-synchronization can be optimized by means of the second PLL section 25. Hence, the advantage is that resynchronization can be quickly accomplished without performing a sweep operation if the factor such as fading deteriorating the quality of a radio trunk is eliminated.

Still further, the integrating circuit 61 can resume its integrating operation even when out-of-synchronization is not recovered after a predetermined period of time from the detection of out-of-synchronization information. Hence, even when the first PLL section 24 cannot execute its unique pulling (phase synchronization), it is not needed to arrange a dedicated sweep generating source to pull the synchronous frequency in an emergency by means of the signal from the second PLL section 25. This feature enables carriers to be regenerated under any trunk environment, with the conventional sweep function maintained.

Moreover, since the updating operation can be automatically started in response to power set-up information to generate a frequency control signal, a variation in characteristic of the voltage controlled oscillator 12 can be absorbed without previously adjusting with a variable resistor. Hence the advantage is that the phase of an input signal can be quickly synchronized just after the power set-up of the receiving-side radio equipment.

In the monitoring circuit 62 shown in FIG. 6, one-bit phase error signal $P_{e4}$ (polarity bit) is used as phase error information input from the phase error detector 3. However, the present invention should not be limited only to that example. For example, as shown with the monitoring circuit 65 in FIG. 10, the phase error information may include error bits $P_{e3}$ to $P_{e1}$, together with the phase error signal $P_{e4}$ (polarity bit) from the phase error detector 3. In this case, the mark ratio is monitored by using the bit information $P_{e4}$ to $P_{e1}$ as 8-bit information $P_{e4}$, $P_{e4}$, $P_{e4}$, $P_{e4}$, $P_{e4}$, $P_{e3}$, $P_{e2}$, $P_{e1}$.

The monitoring circuit 62 shown in FIG. 6 uses the phase error signal $P_{e4}$ representing the mark ratio itself. However, in the monitoring circuit 65, the mark ratio is calculated using the ratio of an addition result for a fixed period of time to an addition result of an absolute value by using the bit information $P_{e4}$ to $P_{e1}$.

Figure 10:
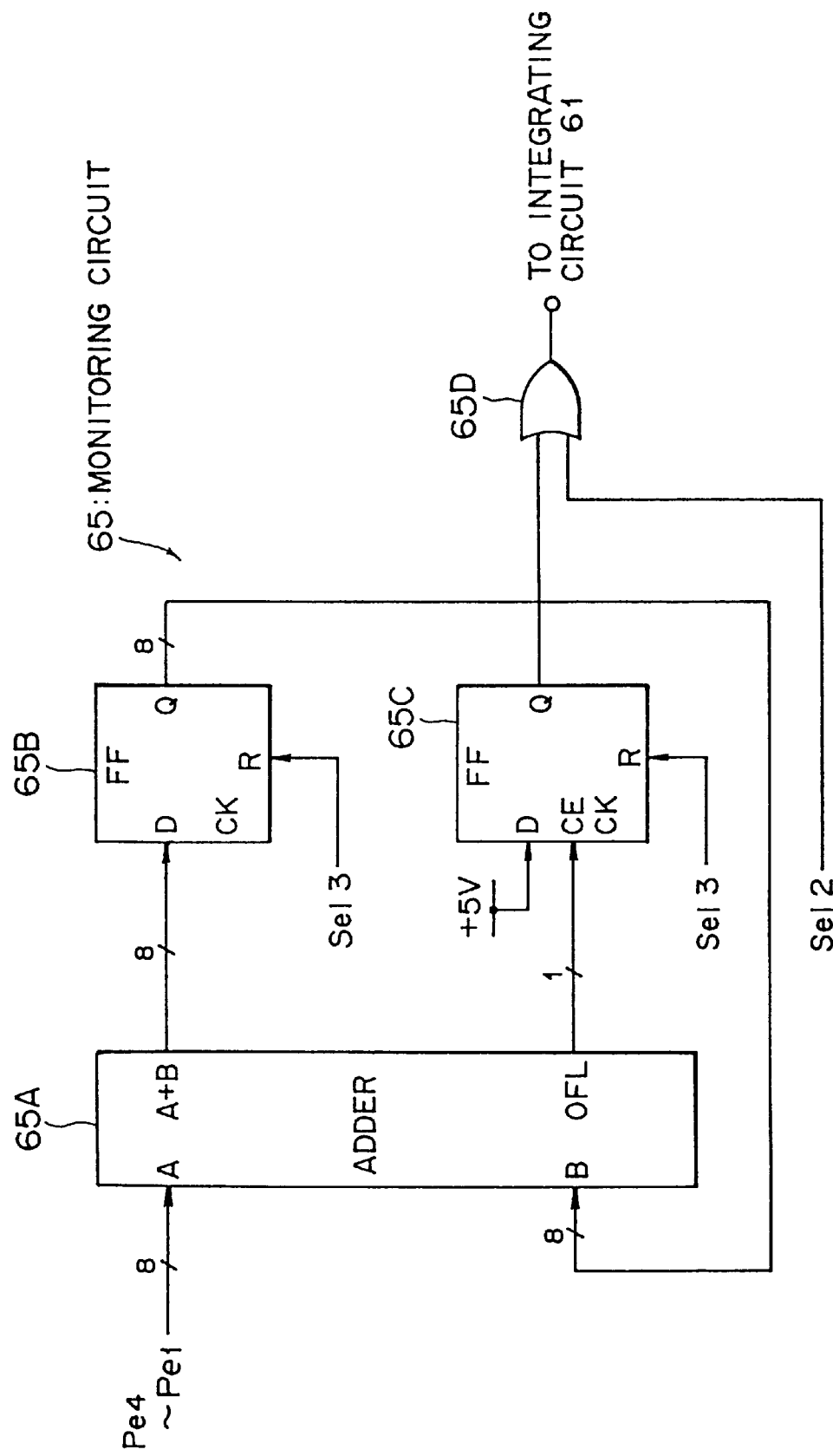
FIG. 10 is a block diagram showing a monitoring circuit as a modified example according to the embodiment of the present invention.

For that reason, the monitoring circuit 65 shown in FIG. 10 includes an adder 65A, a latch circuits (FFs) 65B and 65C, and a logical circuit 65D. The adder 65A adds cumulatively the output (8-bit signals; $P_{e4}$, $P_{e4}$, $P_{e4}$, $P_{e4}$, $P_{e4}$, $P_{e3}$, $P_{e2}$, $P_{e1}$) from the phase error detector 3 and then outputs the result via the latch circuit 65B. As a result of the cumulative addition, when all bit information is "1" or "0", the overflow signal (OFL) is output.

The latch circuit 65B holds temporarily the cumulative added result output from the adder 65A and then updates it.

When the latch circuit 65B receives the signal (Sel3) from the timer circuit 64, the cumulative addition result held in the latch circuit 65B is reset (R).

The latch circuit 65C holds temporarily an overflow signal output from the adder 65A. When being clock-enabled at the CE (clock enable) terminal in response to the overflow signal, the latch circuit 65C outputs an H-level signal of 5 volts in amplitude to the logical circuit 65D. At the same time, when the latch circuit 65C receives the signal (Sel3) from the timer circuit 64, the cumulative addition result held in the latch circuit 65C is reset.

In other words, when the adder 65A outputs an overflow signal, it can be judged that the mark ratio has deviated from a predetermined range. Hence, it can be regarded that the overflow signal is equivalent to a carry-out signal output from the adder 62A.

The logical circuit 65D is formed as an OR (logical add) circuit. The logical circuit 65D subjects the output (overflow signal) from the latch circuit 65C and the signal (Sel2) from the timer circuit 64 to a logical add arithmetic process. If the logical add arithmetic process results in "0" acting as a hold signal, the integrating operation of the integrating circuit 61 is halted. If the logical add arithmetic process results in "1" acting as an integration operation permission signal, the integrating circuit 61 is started to perform its integrating operation.

In such an operation, in response to either the overflow detection information from the latch circuit 65C or the signal (Sel2) from the timer circuit 64, the integrating circuit 61 can perform its integrating operation.

Consequently, since the monitoring circuit 65 shown in FIG. 10 measures a mark ratio based on multiple-bit data, thus monitoring whether or not the mark ratio is within a predetermined range, the degree of distance (+, –) between signal points can be grasped in more detail. As a result, the phase error detection accuracy can be significantly improved.

In the data switching circuit 63 shown in FIG. 7, data suitable for inputting to the integrating circuit 61 is selected based on the one-bit phase error signal $P_{e4}$ from the phase error detector 3. However, like the monitoring circuit 65, the data switching circuit 66, for example, shown in FIG. 11 may perform its data switching operation by using phase error signals $P_{e4}$ to $P_{e1}$ (4 bits: $P_{e4}$, $P_{e3}$, $P_{e2}$, $P_{e1}$) output from the phase error detector 3.

Figure 11:
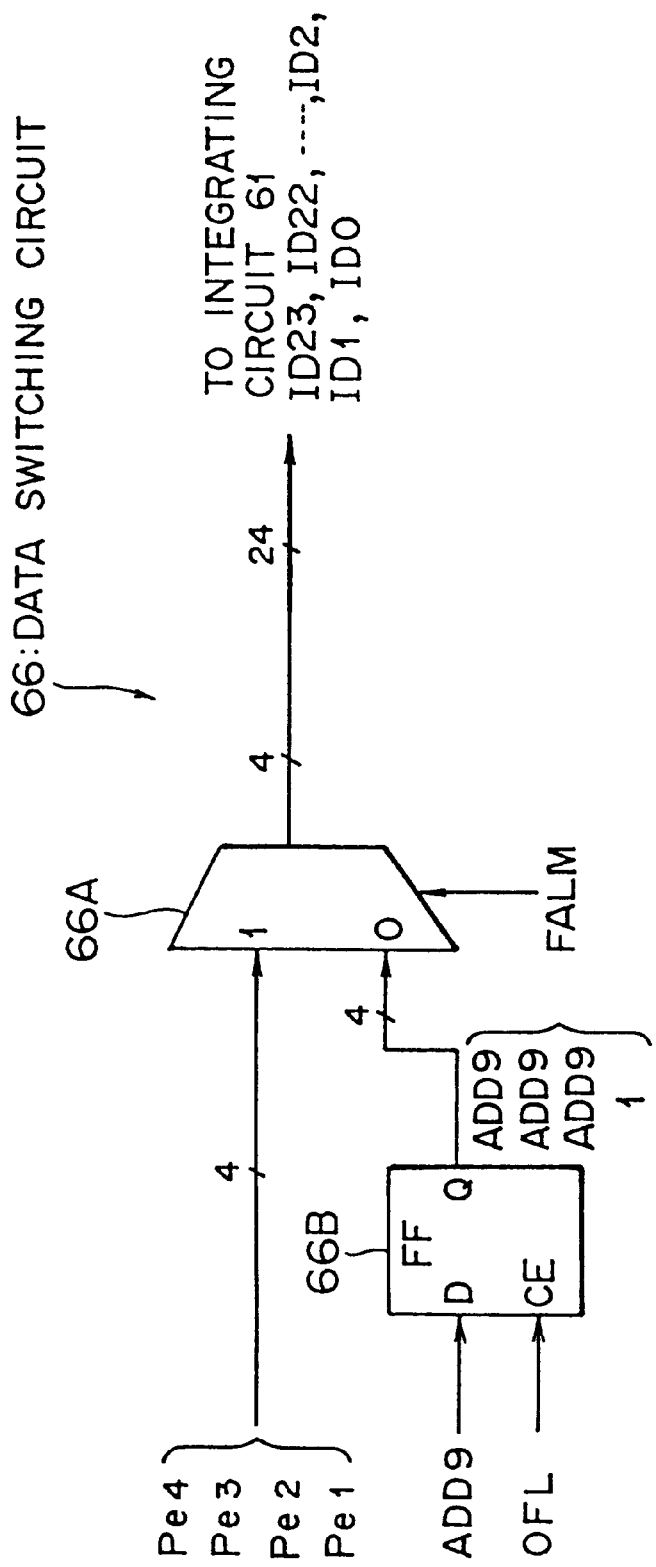
FIG. 11 is a block diagram showing a data switching circuit as a modified example according to the embodiment of the present invention.
Figure 12:
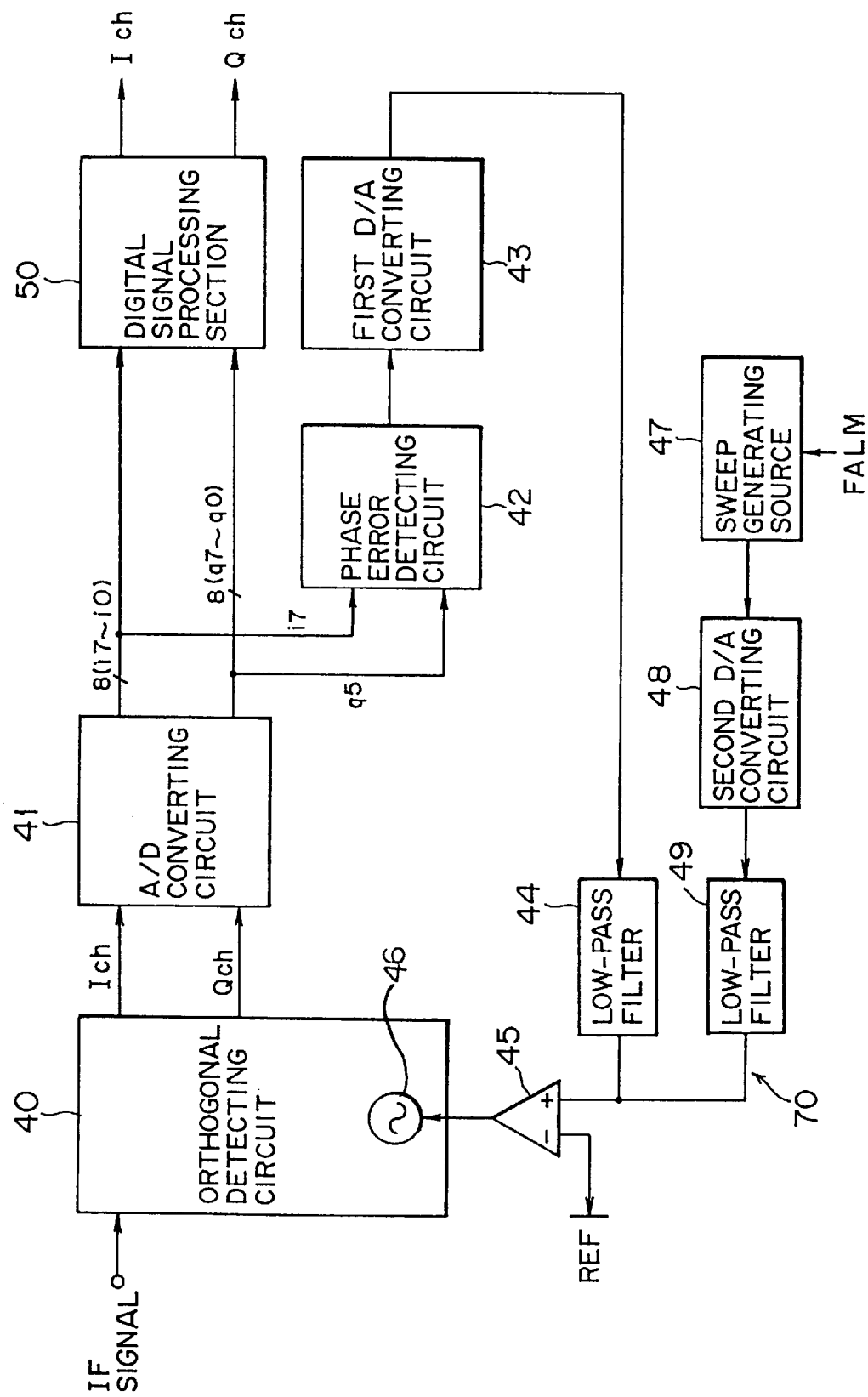
FIG. 12 is a block diagram showing the configuration of a demodulating section of general receiving-side radio equipment.

For that reason, the data switching circuit 66 shown in FIG. 11 is formed of a selector 66A and a latch circuit (FF) 66B. The selector 66A outputs selectively either 4-bit phase error signals $P_{e4}$ to $P_{e1}$ or the 4-bit information (ADD9, ADD9, ADD9, 1) from the latch circuit 66B based on FALM. The latch circuit 66B is identical to the latch circuit 63B. The latch circuit 66B outputs data formed of 4-bits including the upper three bits of ADD9 and the lower bit of "1".

In this case, the selector 66A expands (branches) the converted 4-bit data into 24-bit data [(ID23, ID22, . . . , ID3, ID2, ID1, ID0)=($P_{e4}$, . . . , $P_{e4}$, $P_{e3}$, $P_{e2}$, $P_{e1}$)] and then inputs it to the integrating circuit 61. However, when out-of-synchronization information is detected, data latched in the latch circuit 66B is output to the integrating circuit 61.

The latch circuit 66B outputs 4-bit data (having the least significant bit of 1). For example, when the most significant bit ADD9="1" is latched, the selector 66B outputs (1, 1, 1, 1). When ADD9="0" is latched, the selector 66B outputs (0, 0, 0, 1). In such an operation, like the data switching circuit 63, when ADD9="1", 24-bit data input to the integrating circuit 61 corresponds to (ID23, . . . , ID0)=(1, . . . , 1). When ADD9="0", 24-bit data input to the integrating circuit 61 corresponds to (ID23, . . . , ID0)=(0, . . . , 0, 1).

As described above, even in the data switching circuit 66 shown in FIG. 11, since the input data can be converted into data suitable for inputting to the integrating circuit 61 by using multiple bits, the data switching operation can be performed more accurately. Use of the data switching circuit 66 can provide the same advantage as that in the above-mentioned embodiment.

The embodiment described above is applied to a circuit regenerating carriers from I-data and Q-data each having converted into a digital signal. The present invention also is applicable to the circuit which regenerates a carrier from an analog signal. Such a circuit has nearly the same advantage as that in the above-mentioned case.

In the present embodiment, the orthogonal detecting circuit 1 uses an orthogonal detector. According to the present invention, detectors of other type can be employed as the orthogonal detecting circuit 1.

What is claimed is:

1. A carrier regenerating circuit comprising:

a first PLL (phase-locked loop) section including a detector for detecting an intermediate frequency signal, using a local oscillator, a phase error detecting section for detecting phase error information based on the intermediate frequency signal detected by said detector, and a first loop filter for filtering the phase error information detected by said phase error detecting section, the phase error information being fed back to said local oscillator via said first loop filter; and a second PLL (phase-locked loop) section including a frequency control section for monitoring a mark ratio due to the phase error information from said phase error detecting section and integrating the phase error information to thereby generate a frequency control signal for said local oscillator during the time that the mark ratio deviates from a predetermined range, and a second loop filter for filtering said frequency control signal from said frequency control section the frequency control signal from said frequency control section being fed back to said local oscillator via said second loop filter.

2. The carrier regenerating circuit according to claim 1, wherein said integrating circuit has an adder for cumulatively adding the phase error information, and a latch circuit for selectively updating or holding the cumulative addition result from said adder and wherein said monitoring circuit has a counting circuit for up/down counting the phase error information and then generating an integration halt signal while the mark ratio is within said predetermined range, and for generating an integration permission signal when the mark ration deviates from said predetermined range.

3. The carrier regenerating circuit according to claim 1, wherein said frequency control section is operable to halt the generation of the frequency control signal during the time that the mark ratio is within said predetermined range or upon receipt of out-of-synchronization information.

4. The carrier regenerating circuit according to claim 3, wherein said frequency control section has:

an integrating circuit for integrating the phase error information;

a switching circuit for outputting the phase error information while the out-of-synchronization information is not detected and for switching the phase error information to an output of said integrating circuit when the out-of-synchronization information is detected; and a monitoring circuit for monitoring whether or not the mark ratio deviates from said predetermined range to halt the integrating of said integrated circuit while the mark ratio is within said predetermined range and to start the integrating of said integrating circuit when the mark ratio deviates from said predetermined range, and for monitoring whether or not the out-of-synchronization information has been detected to halt the integrating of said integrating circuit regardless of the value of the mark ratio when the out-of-synchronization information is detected.

5. The carrier regenerating circuit according to claim 4, wherein said integrating circuit has an adder for cumulatively adding the phase error information and a latch circuit for selectively updating or holding the cumulative addition result from said adder, and wherein said monitoring circuit has a counting circuit for up/down counting the phase error information and then generating an integration halt signal while the mark ratio is within said predetermined range or when the out-of-synchronization information is detected, and for generating an integration permission signal when the mark ratio deviates from said predetermined range.

6. The carrier regenerating circuit according to claim 4, wherein said monitoring circuit is operable to resume the integrating of said integrating circuit when a predetermined period of time has been elapsed after detection of the out-of-synchronization information.

7. The carrier regenerating circuit according to claim 6, further comprising a timer circuit for outputting an event signal to said monitoring circuit when a predetermined period of time has been elapsed after the detection of the out-of-synchronization information.

8. The carrier regenerating circuit according to claim 1, wherein said frequency control section is operable to start updating in response to power set-up information to generate the frequency control signal.

9. A carrier regenerating circuit comprising:

a first PLL circuit including:

an orthogonal detector for detecting an intermediate-frequency signal using a local oscillator and then outputting detected signals perpendicular to each other;

an A/D converter for A/D converting said detected signals detected by said orthogonal detector;

a phase error detecting section for detecting phase error information from each of the detection signals A/D converted by said A/D converter;

a first D/A converter for D/A converting said phase error information detected by said phase error detection section; and a first loop filter for filtering said phase error information after the D/A conversion by said first D/A converter;

wherein phase error information is fed back to said local oscillator via a first loop filter; and a second PLL circuit including:

a frequency control section for updating a frequency control signal for said local oscillator based on said phase error information when power set-up information has been received or while a mark ratio due to said phase error information is not within a predetermined range, whereas interrupting an updating operation for generation of a frequency control signal when said mark ratio is within said predetermined range or while out-of-synchronization information has been received;

a second D/A converter for D/A converting the frequency control signal from said frequency control section; and a second loop filter for filtering the frequency control signal after the D/A conversion by said second D/A converter;

wherein said frequency control section executes an updating operation when the power set-up information is received or when said mark ratio deviated from said predetermined range;

wherein after an updating operation for said frequency control signal generation is halted when said mark ratio is within said predetermined range or when out-of-synchronization information has been received, said frequency control signal from said frequency control section is fed back to said local oscillator via said second loop filter.

10. The carrier regenerating circuit according to claim 9, wherein said phase error information input to said frequency control section comprises a polarity bit.

11. The carrier regenerating circuit according to claim 9, wherein said phase error information input to said frequency control section comprises a polarity bit and an error bit.

* * * * *